(12) United States Patent
Tian

(10) Patent No.: US 10,211,763 B2
(45) Date of Patent: Feb. 19, 2019

(54) METHOD FOR AUTOMATICALLY IDENTIFYING SPEED OPERATION RANGE IN A MECHANICAL SYSTEM DRIVEN BY PMSM OR INDUCTION MOTORS UNDER FRICTION AND LOAD CONDITION

(71) Applicant: LINESTREAM TECHNOLOGIES, Cleveland, OH (US)

(72) Inventor: Gang Tian, Westlake, OH (US)

(73) Assignee: LINESTREAM TECHNOLOGIES, Cleveland, OH (US)

(*) Notice: Subject to any disclaimer, the term of this patent is extended or adjusted under 35 U.S.C. 154(b) by 208 days.

(21) Appl. No.: 15/055,810

(22) Filed: Feb. 29, 2016

(65) Prior Publication Data

US 2017/0250628 A1 Aug. 31, 2017

(51) Int. Cl.
*H02P 6/08* (2016.01)
*G05B 19/416* (2006.01)
*G06F 17/11* (2006.01)

(52) U.S. Cl.
CPC .............. *H02P 6/08* (2013.01); *G05B 19/416* (2013.01); *G06F 17/11* (2013.01); *G05B 2219/43203* (2013.01)

(58) Field of Classification Search
CPC ......................................................... H02P 6/08
USPC ......................................................... 700/275
See application file for complete search history.

(56) References Cited

U.S. PATENT DOCUMENTS

| 6,979,967 | B2 | 12/2005 | Ho |
| 7,023,168 | B1 | 4/2006 | Patel et al. |
| 7,339,344 | B2 | 3/2008 | Borisavljevic |
| 7,714,529 | B2 | 5/2010 | Chen et al. |
| 8,041,436 | B2 | 10/2011 | Gao et al. |
| 8,060,340 | B2 | 11/2011 | Gao et al. |
| 8,198,840 | B2 | 6/2012 | Hexamer |
| 8,648,556 | B2 | 2/2014 | Lejeune et al. |

(Continued)

OTHER PUBLICATIONS

International Search Report & Written Opinion for PCT Application Serial No. PCT/US2017/019585, dated May 10, 2017, 9 pages.

(Continued)

*Primary Examiner* — Mohammad Choudhry
(74) *Attorney, Agent, or Firm* — Amin, Turocy & Watson LLP

(57) ABSTRACT

As speed operation range identification system for motion systems driven by permanent magnet synchronous motors (PMSMs) or induction motors leverages both characteristics of the motor as well as dynamic characteristics of the motion system—including the friction and load—to identify suitable maximum speeds for operation of the motion system in the normal speed and field weakening regions. The identification system can model both motor characteristics as well as real-time dynamics of the controlled mechanical system that may vary during operation. The system can apply an optimization algorithm to this model to determine suitable maximum speeds for operation in the normal speed and/or field weakening regions. The determined maximum speeds can be used to perform substantially real-time adjustments to motion profile limits or current reference values generated by the motor controller in order to ensure that the speed of the system remains below the determined maximum.

20 Claims, 13 Drawing Sheets

(56) References Cited

U.S. PATENT DOCUMENTS

| | | |
|---|---|---|
| 8,710,777 B2 | 4/2014 | Tian |
| 8,786,230 B2 | 7/2014 | Lee et al. |
| 8,796,974 B2 | 8/2014 | Wang et al. |
| 9,041,337 B2 | 5/2015 | Tian |
| 2009/0212734 A1 | 8/2009 | Royak et al. |
| 2011/0050146 A1* | 3/2011 | Okita .................. G05B 19/404 318/631 |
| 2013/0026959 A1 | 1/2013 | Sonoda et al. |
| 2013/0249449 A1 | 9/2013 | Uematsu et al. |
| 2014/0055065 A1 | 2/2014 | Suel et al. |
| 2014/0379102 A1 | 12/2014 | Tian et al. |
| 2015/0329317 A1 | 11/2015 | Agirman et al. |
| 2015/0357956 A1 | 12/2015 | Shimada et al. |
| 2016/0033944 A1 | 2/2016 | El-Shaer et al. |

OTHER PUBLICATIONS

International Preliminary Report on Patentability for PCT Application Serial No. PCT/US2017/019585, dated Sep. 4, 2018, 6 pages.

* cited by examiner

METHOD FOR AUTOMATICALLY
IDENTIFYING SPEED OPERATION RANGE
IN A MECHANICAL SYSTEM DRIVEN BY
PMSM OR INDUCTION MOTORS UNDER
FRICTION AND LOAD CONDITION

TECHNICAL FIELD

This disclosure generally relates to motor control, and, more specifically, to techniques for determining speed operation ranges for mechanical systems driven by PMSM motors.

BACKGROUND

Permanent magnet synchronous motors (PMSMs) and induction motors are used in a wide variety of applications, including but not limited to motion control systems, traction or propulsion systems for electric vehicles, HVAC (heating, ventilating, and air conditioning) systems, machine tools (e.g., spindles, rotating worktables, tool articulation), pumps, and the like. In general, PMSMs can be categorized as surface-mounted PMSMs (SPMSMs) or interior-mounted PMSMs (IPMSMs) depending on how the permanent magnets are mounted relative to the rotor.

PMSMs and induction motors are typically controlled using a motor controller (e.g., using field-oriented control techniques) which controls the speed of the motor in accordance with a speed or position reference signal generated by a motion control application. The maximum speed operation range of a given motor used in a control application is typically a function of the motor characteristics as well as the motion control application characteristics, which can be complicated to assess. A designer of a motor or motion application product must consider all of these aspects when selecting a motor to use in a given motion control system, and in order determine if the selected motor can operate within the desired speed range defined by the target application.

The above-described is merely intended to provide an overview of some of the challenges facing conventional motion control systems. Other challenges with conventional systems and contrasting benefits of the various non-limiting embodiments described herein may become further apparent upon review of the following description.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its purpose is to present some concepts of one or more embodiments in a simplified form as a prelude to the more detailed description that is presented later.

Systems and methods described herein leverage both characteristic parameters of a motor used to control a mechanical system as well as dynamic characteristics of the controlled mechanical system—including the friction and load—to identify suitable maximum speeds for operation of the mechanical system one or both of the normal speed and field weakening regions. In one or more embodiments, a speed operation range identification system can mathematically model both motor characteristics (e.g. stator resistance and inductance, rotor flux, number of pole pairs) as well as real-time dynamics of the controlled mechanical system that may vary during operation (e.g., frictions and load). The system can apply an optimization algorithm to this model to determine suitable maximum speeds for operation in the normal speed and/or field weakening regions. The determined maximum speeds can be used to perform substantially real-time adjustments to motion profile limits or current reference values generated by the motor controller in order to ensure that the speed of the system remains below the determined maximum.

The following description and the annexed drawings set forth herein detail certain illustrative aspects of the one or more embodiments. These aspects are indicative, however, of but a few of the various ways in which the principles of various embodiments can be employed, and the described embodiments are intended to include all such aspects and their equivalents.

DETAILED DESCRIPTION

Figure 1:
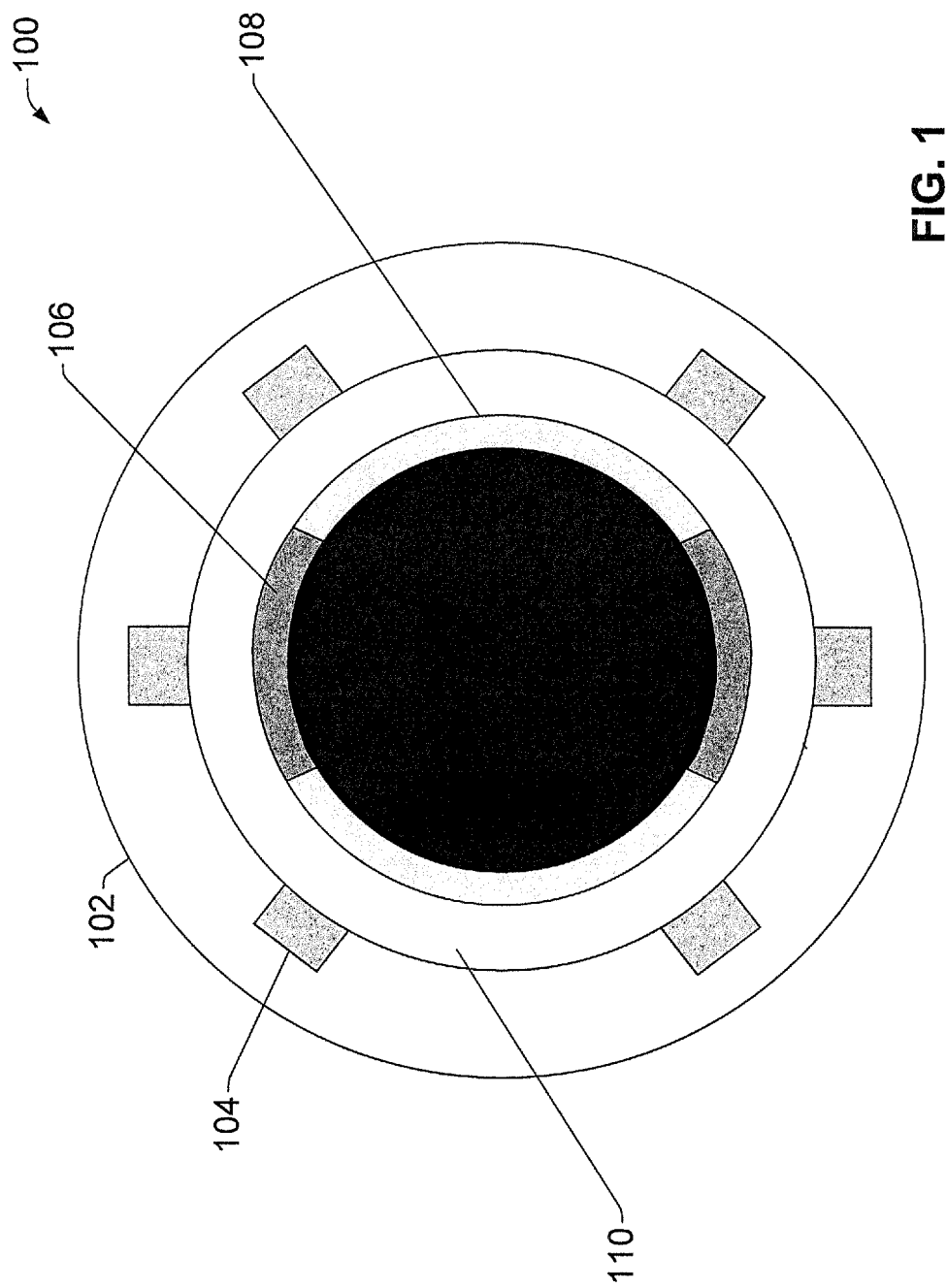
FIG. 1 is a simplified diagram of an example SPMSM.

Various embodiments are now described with reference to the drawings, wherein like reference numerals refer to like elements throughout. In the following description, for the purposes of explanation, numerous specific details are set forth in order to provide an understanding of this disclosure. It is to be understood, however, that such embodiments may be practiced without these specific details, or with other methods, components, materials, etc. In other instances, structures and devices are shown in block diagram form to facilitate describing one or more embodiments.

Permanent magnet synchronous motors (PMSMs) and induction motors are used in a wide variety of applications. For example, many industrial automation applications rely on such motors and their associated control systems to drive motion of system components (e.g., machining or material handling robots, conveyors, tooling machines, hand tools, etc.). PMSMs and induction motors are also used in the traction and/or propulsion systems of some electric vehicle designs, including but not limited to electric or hybrid electric automobiles, bicycles, forklifts and other industrial vehicles, scooters, railway vehicle such as trains, and other such vehicles. PMSMs and induction motors also have application in building infrastructure and HVAC (heating, ventilating, and air conditioning) applications that require speed or motion control, such as fans and pumps. These motors can also be found in many home and industrial appliances. For example, PMSMs or induction motors can be used drive the drums of home or industrial washing machines, to control the spinning of centrifuges, or to control the motion of other such appliances.

In general, PMSMs can be categorized as surface-mounted PMSMs (SPMSMs) or interior-mounted PMSMs (IPMSMs). FIG. 1 is a simplified diagram of an example SPMSM 100. SPMSM 100 comprises a rotor 108 configured to rotate within a stator 102. The stator 102 includes a number of electrical windings 104 arranged to surround the rotor 108. For SPMSMs, permanent magnets 106 are mounted on the surface of the rotor 108. During operation, electrical current through the windings 104 sets up a magnetic field within the air gap 110 between the rotor 108 and the stator 102, and the interaction between the magnets 106 and the magnetic field causes the rotor 108 to rotate, producing torque. The speed and direction of the rotor 108 can be controlled by controlling the current through the stator windings 104. IPMSMs are similar to SPMSMs, except that the permanent magnets 106 are buried within the rotor 108 rather than being mounted on the surface.

Figure 2:
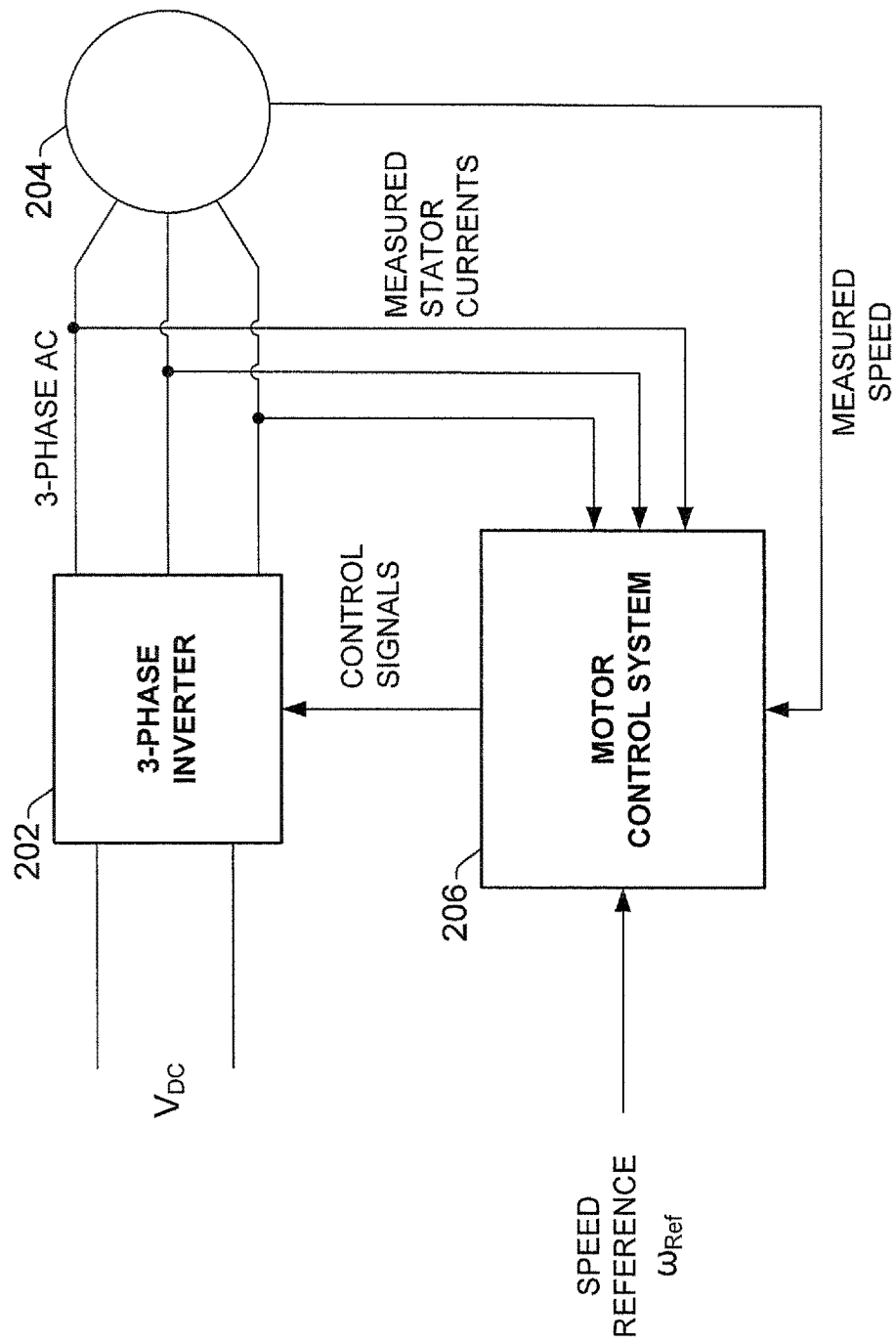
FIG. 2 is a simplified diagram of an example closed-loop control system for a PMSM.

FIG. 2 is a simplified diagram of an example closed-loop control system for a motor 204 (either an SPMSM, an IPMSM, or an induction motor). Control system 206 drives the PMSM 204 in accordance with a speed reference signal $\omega_{Ref}$, which is generated by a separate motion control application. A 3-phase inverter 202 converts direct current (DC) bus voltage $V_{DC}$ to controlled 3-phase AC power to the motor's stator windings, where the 3-phase AC power is controlled based on control signals (e.g., pulse width modulation signals, space vector modulation signals, etc.) generated by the control system 206. For control systems that include speed or position sensors, the speed of motor 204 is measured and provided to the control system 206, which adjusts the control signals as a function of the measured speed, the speed reference, and the measured stator currents. For sensorless control systems, which are not capable of directly measuring the motor speed, control system 206 estimates the angle and speed of the motor based on the measured stator currents.

Although the diagram of FIG. 2 depicts the speed of the motor being controlled by a speed reference signal, some control systems are designed to control the motor based on a position reference signal rather than or in addition to the speed reference. In such systems, the position of the motor is controlled based on a position reference signal provided to control system 206.

PMSMs and induction motors are often controlled using field oriented control (FOC) techniques. According to FOC, the flux and torque components of the stator currents are controlled independently by the control system 206 based on the external speed reference signal $\omega_{Ref}$ and the rotor position. When operating at or below its rated or base speed, the motor can be controlled to produce a constant torque for any speed, and is therefore said to be operating in the constant torque region (also referred to as the normal speed region). In order to increase the motor speed above its base or rated speed, some FOC control systems include field-weakening control capabilities. Once the inverter 202 output voltage has reached its maximum voltage—typically concurrently with the motor reaching its rated speed—field weakening control can be used to weaken the air gap flux density induced by the motor's permanent magnets, allowing additional current to be sent to the motor and thus increasing the motor speed beyond the rated speed. In this mode, the PMSM is said to be operating in the field-weakening region.

For a given motion application comprising a motor and an associated control system directed by a motor control application, there is a maximum speed operation range that is a function of the motor's characteristics as well as the dynamic mechanical characteristics of the motion system (e.g., the load seen by the motor, the inertia, etc.). A designer of a motion application must consider these aspects when selecting a motor to use in the motion application, as well as to determine whether the motor can operate within the desired speed range dictated by the motion application.

During operation, typical motor applications lack the ability to evaluate, in real-time, whether a new speed reference command generated by the motion control application is within a valid speed operation range given the characteristics of the motor as well as the dynamic motion characteristics. In conventional approaches, designers may only use a model of the motor to determine valid operating ranges for a motion application. For example, using the motor model, the designer may derive a maximum torque at each speed of a range of speeds subject to the current and voltage magnitude limits. This torque-speed curve characterizes the torque generation capacity of the motor. As a result, in an ideal case, the maximum speed in the field weakening region is achieved when torque approaches zero, assuming no load and no friction. However, this model design approach does not reflect real-time system dynamics. For example, the friction and the load in a motion application will not be zero during operation, with the viscous friction in particular being proportional to the speed. For some motion applications, the characteristics of the motion system may vary by large degrees during operation. Consequently, predetermined limits on motor speed derived using a motor model may not be valid under all circumstances during operation.

To address these and other issues, systems and methods described herein relate to a speed operation range identification system for PMSM or induction motor control systems. In one or more embodiments, the speed operation range identification system executes an optimization algorithm that uses the dominant motor and motion parameters to determine, in real-time during operation, a maximum speed of a PMSM or induction motor in the normal speed range as well as in the field weakening range. In contrast to the motor model approach, the speed operation range identification system implements an approach that combines motion and motor models in order to determine the maximum speed in both the constant torque (normal speed) region and the constant power (field weakening) region. The speed operation range identification system can receive certain motor and motion parameters as inputs, some of which can be identified by any suitable online parameter estimator, thereby allowing the maximum speed values to be identified in real-time during operation of the motion system to reflect the dynamic changes in motor and motion characteristics. The maximum speed derived by the speed operation range identification system can be used to protect the motion application by adjusting motion profile limits generated by the motion control application, or for other purposes in which accurate maximum operating speeds are useful.

Figure 3:
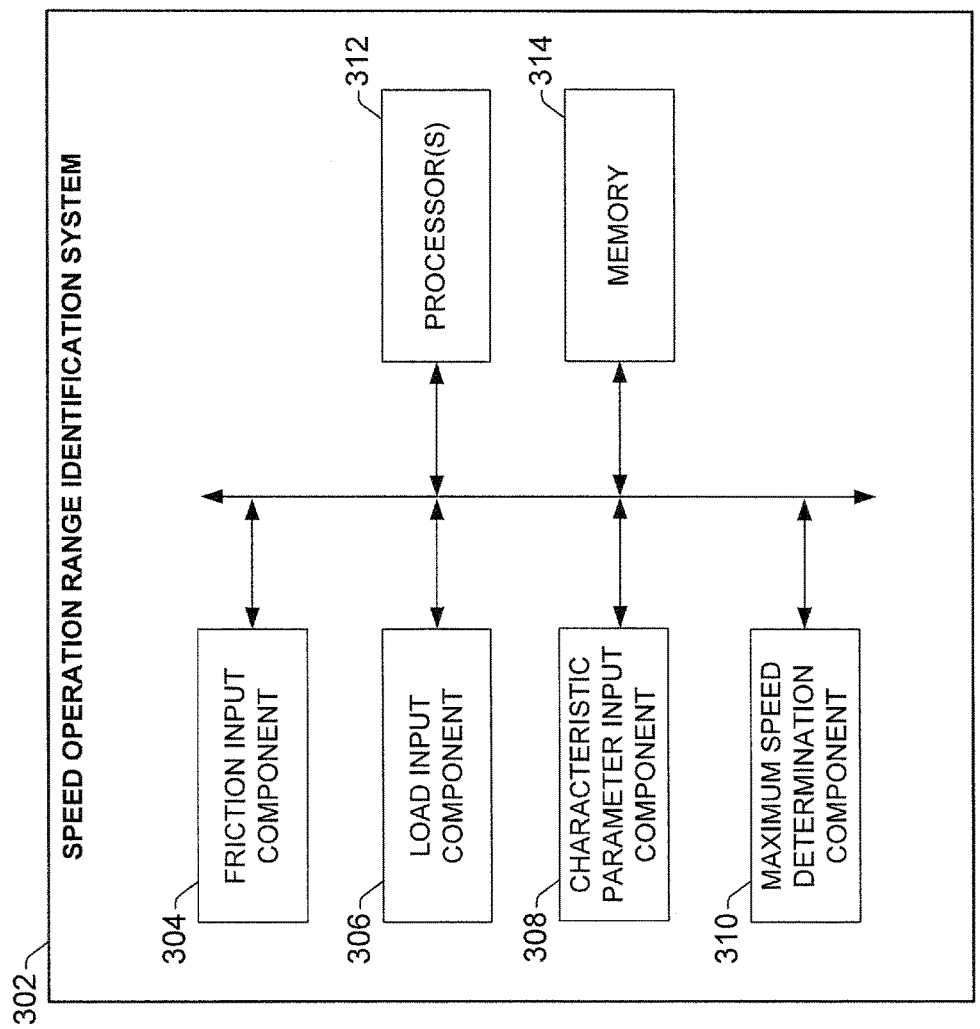
FIG. 3 is a block diagram of an example PMSM speed operation range identification system.

FIG. 3 is a block diagram of an example speed operation range identification system 302 according to one or more embodiments. Speed operation range identification system 302 can include a friction input component 304, a load input component 306, a characteristic parameter input component 308, a maximum speed determination component 310, one or more processors 312, and memory 314. In various embodiments, one or more of the friction input component 304, load input component 306, characteristic parameter input component 308, maximum speed determination component 310, the one or more processors 312, and memory 314 can be electrically and/or communicatively coupled to one another to perform one or more of the functions of the speed operation range identification system 302. In some embodiments, components 304, 306, 308, and 310 can comprise software instructions stored on memory 314 and executed by processor(s) 312. The speed operation range identification system 302 may also interact with other hardware and/or software components not depicted in FIG. 3. For example, processor(s) 312 may interact with one or more external user interface devices, such as a keyboard, a mouse, a display monitor, a touchscreen, or other such interface devices.

Friction input component 304 can be configured to receive, measure, or otherwise determine Coulomb friction and viscous friction estimates; e.g., from an online parameter estimation system. In some embodiments, friction input component 304 may be configured to receive manually provided values of the Coulomb friction and viscous friction coefficient for a given motor system, where these values may be determined by a design engineer using independent measurement techniques. Alternatively, some embodiments of friction input component 304 may be configured to automatically determine values of the Coulomb friction and viscous friction coefficient based on measurements taken during operation of the motion system, or during a defined test sequence designed to output a controlled test torque command signal to the motion system, and measure corresponding velocities of the system in response to the torque command values.

Load input component 306 can be configured to receive, measure, or otherwise determine an amount of load on the motion system. The load value used to determine the maximum speeds may be either a constant load value seen by the motion system or a defined maximum allowable load for the motion system. Characteristic parameter input component 308 can be configured to receive characteristic parameters of a motor used in the motion system. These characteristic parameters can include the q-axis and d-axis stator inductances, the stator resistance, the rotor flux, and the number of pole pairs Pp of the motor. These values obtained by the friction input component 304, load input component 306, and characteristic parameter input component 308 are used by the system to model the motor and the dynamic motion characteristics of the motion system The maximum speed determination component 310 can be configured to determine a maximum speed for the motion system during operation based on an optimization algorithm that leverages both motor and dynamic motion models. The maximum speed determination component 310 can determine the maximum speed in substantially real-time based on dominant motor and motion parameters, including friction and load.

The one or more processors 312 can perform one or more of the functions described herein with reference to the systems and/or methods disclosed. Memory 314 can be a computer-readable storage medium storing computer-executable instructions and/or information for performing the functions described herein with reference to the systems and/or methods disclosed.

Figure 4:
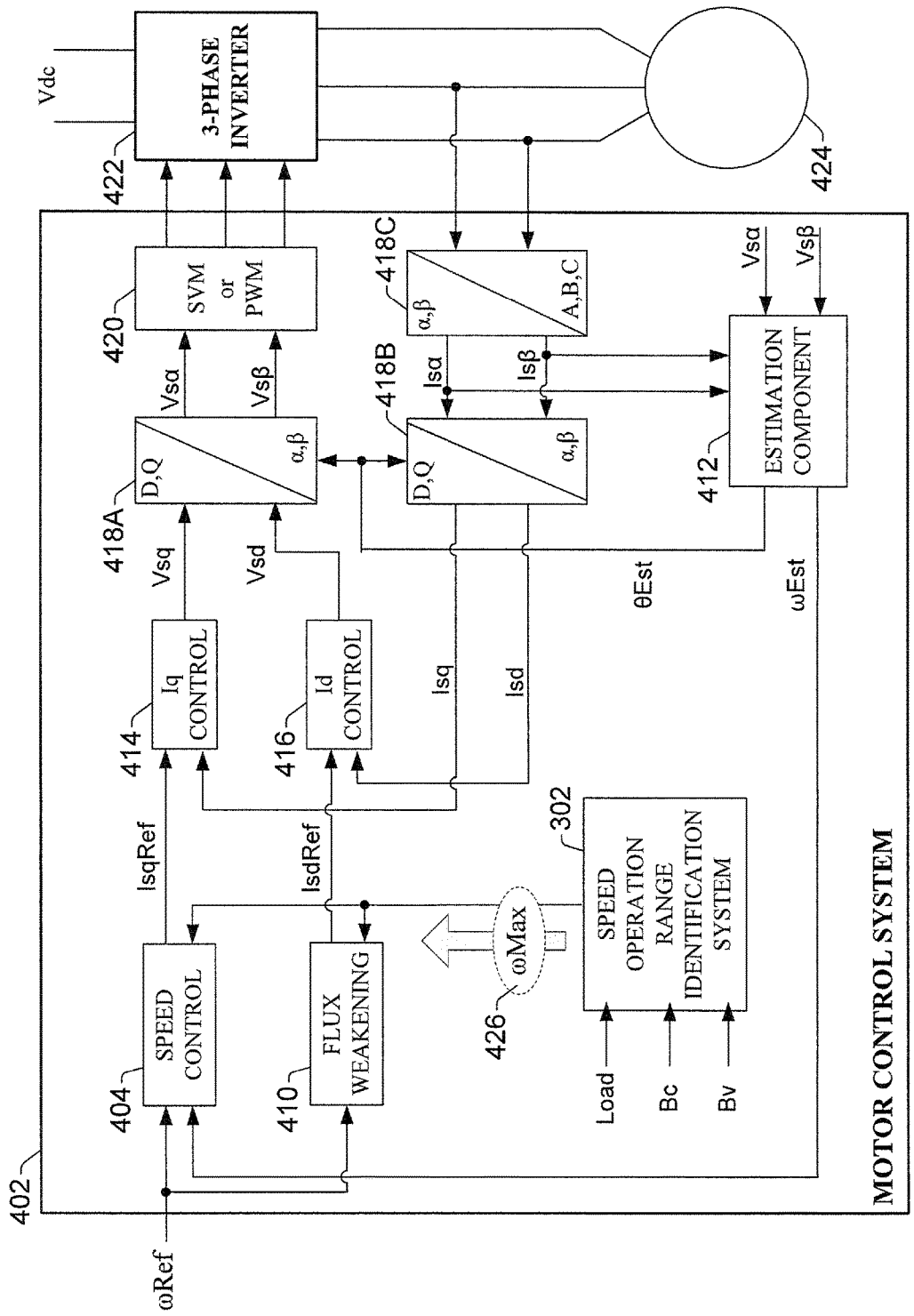
FIG. 4 is a block diagram of an example, non-limiting configuration for a PMSM control system that includes a speed operation range identification system for determining a valid speed operating range for a mechanical system driven by a PMSM motor.

FIG. 4 illustrates an example, non-limiting configuration for a SPMSM control system 402 that includes a speed operation range identification system 302 for determining a valid speed operating range for a mechanical system driven by a PMSM motor. Although FIG. 4 depicts speed operation range identification system 302 as an integrated component of PMSM control system 402, it is to be appreciated that the identification system 302 is not limited to such embodiments. For example, identification system 302 may be embodied as a separate component that is independent of PMSM control system 402, or may be used within the context of a different type of motor control system.

In an example embodiment, PMSM control system 402 can be implemented as part of a motor drive (e.g., a variable frequency drive) that controls motion of a PMSM 424 in accordance with a speed reference signal $\omega_{Ref}$ provided by a supervisory motion control application or system. In another example embodiment, PMSM control system 402 may be implemented on one or more processing chips as part of an embedded system for controlling a PMSM. In yet another example embodiment, PMSM control system 402 can be implemented as part of a motor control module of an industrial controller for control of a PMSM used in an industrial motion control system. It is to be appreciated that the techniques described herein are not limited to these implementations.

In this example, PMSM 424 is a sensorless motor whose motion is controlled by PMSM control system 402. However, the speed operation range identification techniques described herein are not limited to sensorless applications. In general, the PMSM control system 402 controls the PMSM using a flux control loop and a torque control loop. Torque reference $I_{sqRef}$ and the flux reference $I_{sdRef}$ represent target references for the torque and flux components, respectively, of the stator currents. To provide feedback for the flux and torque control loops, the PMSM control system 402 measures the stator currents on two phases of the three-phase AC power delivered to PMSM 424 and calculates the current for the third phase based on the values of the other two phases. Alternatively, the PMSM control system 402 may measure all three phases in order to obtain the stator currents. A transformation block 418C transforms the stator current measurements from the three-phase A, B, C reference to the stationary $\alpha,\beta$ coordinate framework (e.g., a Clarke transformation) to yield $I_s\alpha$ and $I_s\beta$. Transformation block 418B transforms $I\alpha$ and $I\beta$ to the rotary d,q coordinate framework (e.g., a Park transformation) to yield $i_{sq}$ and $i_{sd}$. Iq control component 414 and Id control component 416 compare the values of $i_{sq}$ and $i_{sd}$ to their corresponding reference values $I_{sqRef}$ and $I_{sdRef}$, and adjust reference voltage values $V_{sq}$ and $V_{sd}$ based on any detected errors between the measured values $i_{sq}$ and $i_{sd}$ and their corresponding reference values $I_{sqRef}$ and $I_{sdRef}$.

Transformation block 418A (transforms $V_{sq}$ and $V_{sd}$ from the rotary d,q framework to the stationary α,β framework (e.g., an inverse Park transform) to yield $V_{s\alpha}$ and $V_{s\beta}$. Based on these values, a control signal output component, such as a space vector modulation (SVM) component or pulse width modulation (PWM) component 420, controls the AC output of a 3-phase inverter 422, thereby controlling motion of the PMSM. During closed-loop sensorless FOC control operation, estimation component 412 estimates the speed of the PMSM 424 based on measured stator currents $I_{s\alpha}$ and $I_{s\beta}$ and reference voltage values $V_{s\alpha}$ and $V_{s\beta}$. The estimated velocity $\omega_{Est}$ is compared with a speed reference $\omega_{Ref}$ (received from a separate motion control application), and the speed control component 404 adjusts $I_{sqRef}$ as needed based on detected errors between the speed reference $\omega_{Ref}$ and the estimated velocity $\omega_{Est}$. Flux weakening control component 410 controls the value of the flux reference $I_{sdRef}$. As an alternative to sensorless control, the control system 402 may measure the actual speed of the PMSM directly, rather than estimating the speed using estimation component 412.

In accordance with one or more embodiments of this disclosure, motor control system 402 also includes a speed operation range identification system 302 capable of determining a suitable maximum speed $\omega_{Max}$ for both the normal operating range as well as the field weakening range. The speed operation range identification system 302 can be provided with a number of motor characteristic parameters, including the stator resistance, stator inductances, rotor flux, voltage and current limits, and number of pole pairs, in order to model the motor's characteristics. Also, during execution of the motion control application, the speed operation range identification system 302 can receive or determine certain dynamic motion parameters—including the Coulomb friction Bc, the Viscious friction coefficient Bv, and load W (either constant load or maximum load)—and determine a maximum speed $\omega_{Max}$ based on an optimization algorithm that is a function of these parameters. The optimization algorithm will be described in more detail below.

In the example illustrated in FIG. 4, the determined value of the maximum speed $\omega_{max}$ 426 is provided to the speed control component 404 and/or the flux weakening control component 410, which can compare the maximum speed $\omega_{max}$ with reference speed $\omega_{Ref}$ and modify the references $I_{sdRef}$ and $I_{sdRef}$ as necessary (e.g., if it is determined that $\omega_{Ref}$ exceeds $\omega_{max}$) to ensure that the motor speed does not exceed $\omega_{max}$. However, the value of $\omega_{max}$ may also be used in other ways in various embodiments. For example, in some configurations the speed operation range identification system 302 may provide $\omega_{max}$ to the motion control application, which may modify its generated motion profile (which sets the value of reference speed $\omega_{Ref}$) based on the maximum speed $\omega_{max}$ determined by the identification system 302. In various embodiments, the speed operation range identification system 302 can be a component of a motion controller or a motor drive, or may execute on a separate system that interfaces with the motion control system (assuming the separate system is capable of measuring, calculating, or receiving the friction values required by the system do determine the maximum speeds).

Figure 5:
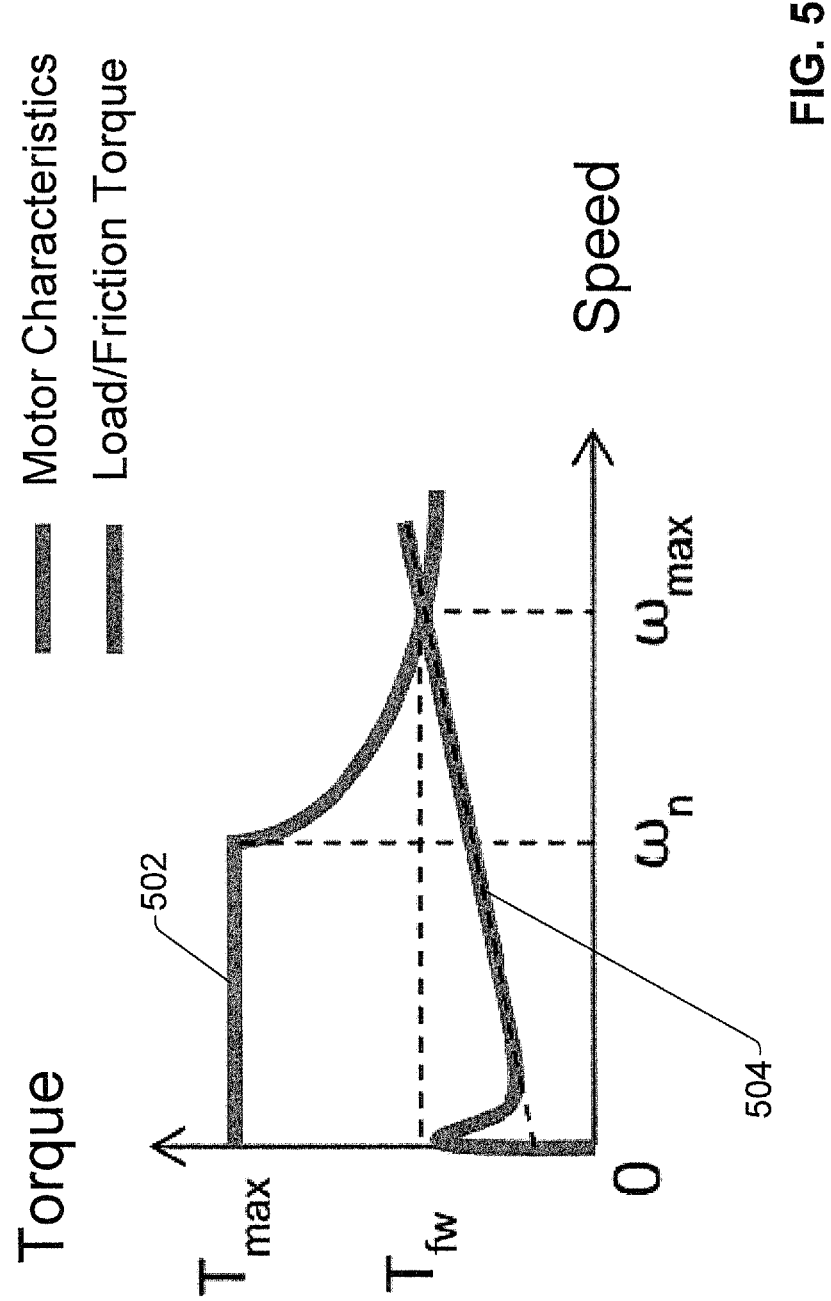
FIG. 5 is an example plot that graphs the torque capacity of a motor as a function of speed as determined by the motor characteristics, together with the steady state torque of the motion system as a function of speed as determined by the combined load and friction seen by the motor.
Figure 6:
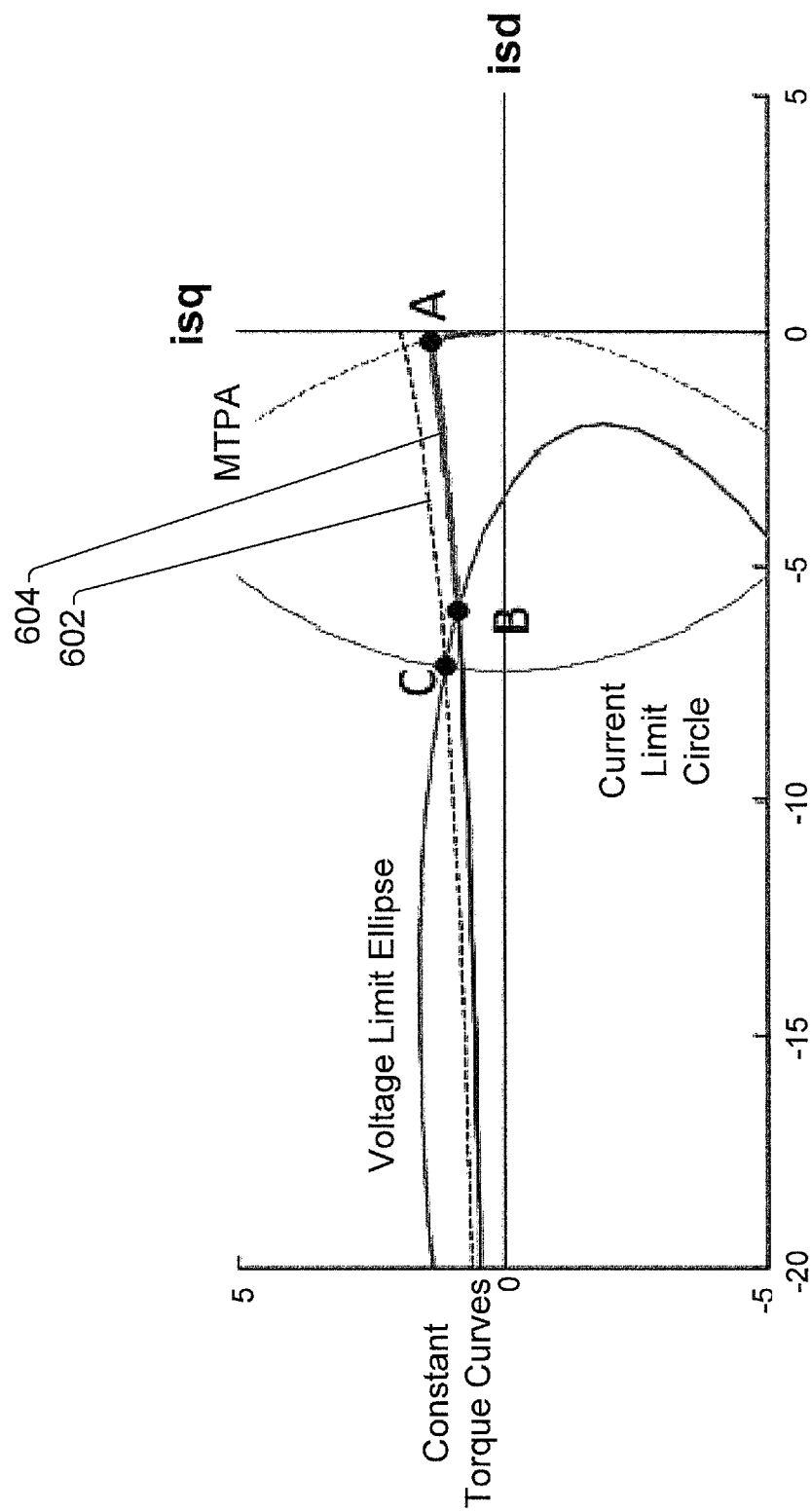
FIG. 6 is a d-q coordinate graph illustrating curves on the d-axis and q-axis current phase plane for a scenario in which the maximum speed is on the current limit circle for an IPMSM motor.
Figure 7:
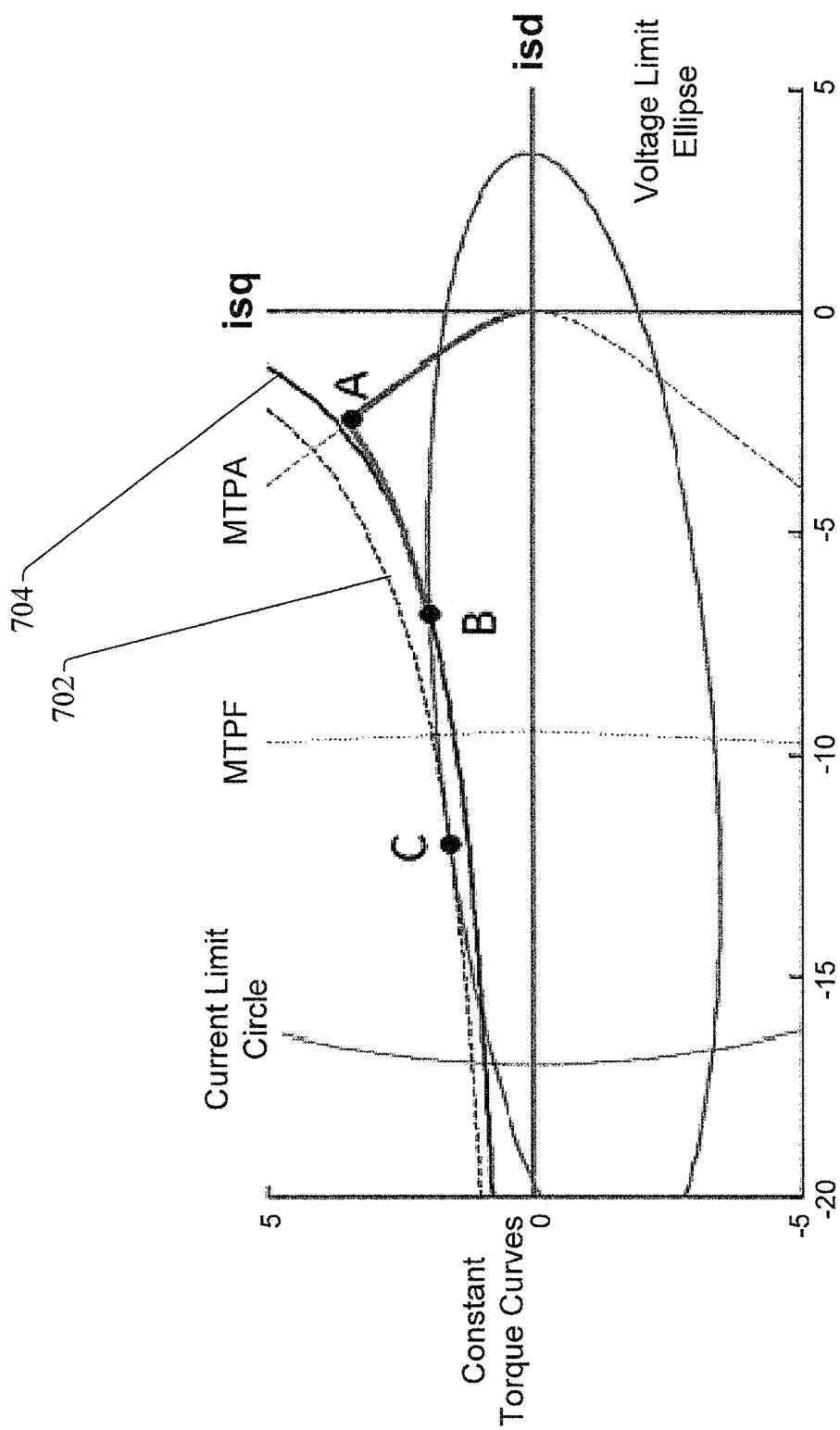
FIG. 7 is a d-q coordinate graph illustrating curves on the d-axis and q-axis current phase plane for a scenario in which the maximum speed is inside the current limit circle for an IPMSM motor.

FIGS. 5-7 and the associated descriptions below discuss concepts and observations that form the basis for the optimization algorithm executed by the speed operation range identification system 302. FIG. 5 is an example plot that graphs the torque capacity of a motor as a function of speed (curve 502) as determined by the motor characteristics, together with the steady state torque of the motion system as a function of speed (curve 504) as determined by the combined load and friction seen by the motor. As demonstrated by curve 502, the torque capacity of the motor is relatively constant from the resting state up to speed $\omega_n$. This speed range—from 0 to $\omega_n$—is referred to as the constant torque region, or normal speed region. While operating at speeds below $\omega_n$, the motor is capable of providing up to its maximum torque capacity $T_{max}$ as needed to compensate for load and friction, as well as to provide acceleration.

If the modulation index reaches the linear boundary, field weakening can be used to achieve speeds greater than $\omega_n$ if desired. While operating in this region, as the speed increases above $\omega_n$, the torque capacity of the motor begins decreasing as a function of speed, while the power P remains relatively constant at P=T*ω. Since the torque T is equal to P/ω, the torque capacity decreases as speed ω increases. This operating region above $\omega_n$ is referred to as the constant power region, or field weakening region.

Curve 504 represents the actual torque needed to overcome friction and load in order for the motor to maintain a given speed. As demonstrated by curve 504, after an initial spike in the torque to overcome initial friction when starting the motion system from rest, the steady state torque required to overcome friction and load of the motion system increases as a function of speed. In the field weakening (constant power) region, the maximum speed corresponds to $\omega_{Max}$ (where the torque capacity curve 502 meets the steady state torque curve 504). The torque $T_{fw}$ represents the torque required to maintain this maximum speed $\omega_{Max}$ in the field weakening region.

Since the steady state torque curve 504 may change during operation as a function of dynamic motion system characteristics, particularly the friction and load, optimal values of the maximum speeds in the normal speed and field weakening regions may change during operation of the motion system. Consequently, designing the system assuming constant, pre-defined values for the maximum speeds may yield non-optimal performance. Accordingly, the speed operation range identification system 302 described herein is configured to dynamically generate a suitable maximum speed values during system operation given current system parameter dynamics.

FIG. 6 is a d-q coordinate graph illustrating curves on the d-axis and q-axis current phase plane for a scenario in which the maximum speed is on the current limit circle for an IPMSM motor. The voltage limit ellipse defines the voltage limit of the inverter (e.g., inverter 422). The size of this voltage limit ellipse is a function of motor speed. The current limit circle represents the current limit of the inverter (e.g., inverter 422), and has a radius of $I_{max}$. Constant torque curves 602 and 604 for two respective torques are shown.

The voltage limit ellipse and the current limit circle limit the operational ranges of the d-axis and q-axis currents. The size of the voltage limit ellipse decreases as the motor speed increases. The maximum torque per ampere (MTPA) curve represents the locus of points ($i_{sd}$, $i_{sq}$) that yield a desired torque with the minimum amount of current. That is, each point on the MTPA curve represents an ($i_{sd}$, $i_{sq}$) coordinate on a given constant torque curve that is closest to the origin (thus corresponding to minimum current magnitude). As the ($i_{sd}$, $i_{sq}$) coordinates move farther from the origin, the corresponding constant torque curve represents a higher torque.

Point C in FIG. 6 is the point at which the voltage limit ellipse and current limit circle intersect, and represents the point at which maximum speed is achieved without the consideration of reserved extra torque (a percentage of the rated torque) besides the maximum load and friction. The reserved extra torque is represented by the difference between constant torque curves 602 and 604. Point A represents the maximum speed in the constant torque region (no field weakening) determined by the speed operation range identification system 302 described herein. Point B is the operating point representing the maximum speed in the field weakening region determined by the speed operation range identification system 302 described herein.

During operation in the constant torque region, the motor will speed up such that the ($i_{sd}$, $i_{sq}$) point traverses the trajectory from the origin along the MTPA curve to reach Point A (the maximum speed in the constant torque region). In the field weakening (constant power) region, coordinate ($i_{sd}$, $i_{sq}$) then continues to Point B along the constant torque curve.

FIG. 7 is a d-q coordinate graph illustrating curves on the d-axis and q-axis current phase plane for a scenario in which the maximum speed is inside the current limit circle (the constant torque curve and the voltage limit ellipse share a mutual tangent line) for an IPMSM motor. In this scenario, Point C represents the maximum speed that can be achieved in the field-weakening region, without the consideration of reserved extra torque (a percentage of rated torque) besides the maximum load and friction. However, in this scenario torque values corresponding to points near Point C along the voltage limit ellipse will always be less than the torque value corresponding to Point C (i.e., such torque values would reside on different constant torque curves than that of Point C). As a result, the torque will not asymptotically converge to the speed represented by Point C. To solve this problem, a reserved torque—represented by the difference between the dashed constant torque curve 702 and the solid constant torque curve 704—is added to the load. In this way, the identified maximum speed is actually reached at Point B, the cross point between the voltage limit ellipse and the solid constant torque curve 704. Since Point B is a cross point (rather than a tangent point) of the voltage limit ellipse, the torque will asymptotically converge to this Point B given the appropriate controller setting. FIG. 7 also depicts the maximum torque per flux (MTPF) curve, which represents the locus of points ($i_{sd}$, $i_{sq}$) that yield a desired torque with the minimum amount of flux, establishing the lower boundary of the field-weakening d-axis current on the DQ phase plane.

Figure 8:
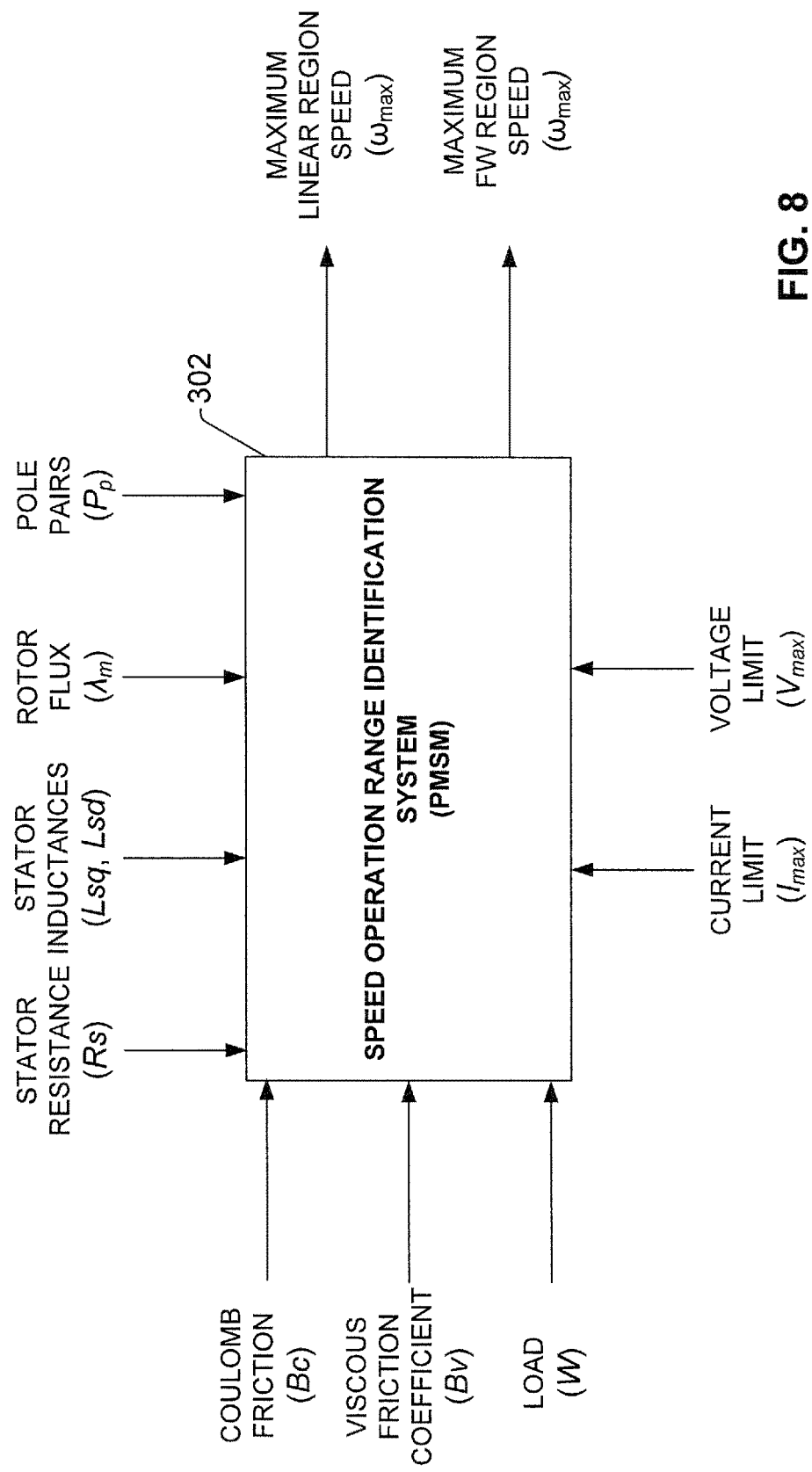
FIG. 8 is a diagram illustrating inputs and outputs of the speed operation range identification system for determination of maximum operating speeds for a PMSM motion system.

Techniques carried out by the speed operation range identification system 302 to determine the maximum speeds described above in real-time are now described. FIG. 8 is a diagram illustrating inputs and outputs of the speed operation range identification system 302 for PMSM motion systems (maximum speed determination for the induction motor case will be described below in connection with FIG. 9). The system is provided with characteristic parameters of the PMSM (e.g., via input provided to the characteristic parameter input component 308), including the q-axis and d-axis stator inductances Lsq and Lsd, the stator resistance $R_S$, the rotor flux $\lambda_m$, and the number of pole pairs Pp of the motor. The stator resistance $R_S$ and inductances Lsq and Lsd can be measured or obtained from the motor data sheet for the PMSM. The rotor flux $\lambda_m$ is a known or identified constant value.

The current and voltage constraints $I_{max}$ and $V_{max}$ of the PMSM are also provided to the speed operation range identification system 302. The maximum current $I_{max}$ is the maximum operational current of the PMSM and corresponds to the radius of the current limit circle (see, e.g., the current limit circles of FIGS. 6 and 7).

In addition to the motor parameters discussed above, speed operation range identification system 302 is also provided with dominant motion parameters. Specifically, the system is provided with the Coulomb friction Bc and viscous friction coefficient Bv for the motion system. Friction is the resistive force resulting from the sliding contact between physical components of the motion system, such as the contact between the rotor and the shaft. The system's total friction can be modeled as a combination of its Coulomb friction Bc and viscous friction. The system's Coulomb friction Bc has a relatively constant magnitude represented by the magnitude of the friction just as the system begins moving from a state of rest. The viscous friction, which represents a frictional force which may be a function of lubrication between moving parts of the system, typically increases as a function of the speed of the motion system, and has a speed-dependent magnitude based on the viscous friction coefficient Bv. Estimates of the motion system's Coulomb friction Bc and viscous friction coefficient Bv can be determined using any suitable online parameter estimator. An example inertia and friction estimation system capable of generating such estimates is described in co-pending U.S. patent application Ser. No. 14/851,307, the entirety of which is incorporated herein by reference. The load, which can be a measured constant value or allowable maximum value, is also provided to the speed operation range identification system 302.

The optimization algorithm carried out by the speed operation range identification system 302 given these parameters is now described. The system considers a motion model that includes Coulomb and viscous friction, as well as load W (either constant load or maximum load). At steady state, the mechanical torque Tm needed to maintain constant speed ω can be considered the sum of the viscous friction (which is a dynamic function of speed), the coulomb friction Bc, and the load W. If the viscous friction is assumed to be the viscous friction coefficient Bv multiplied by the electrical speed ω divided by the number of pole pairs Pp, which yields mechanical speed (for simplicity, speed is defined as electrical speed in this disclosure), the steady state mechanical torque needed to maintain constant speed ω can be written as:

$$T_m = \frac{B_v \omega}{P_p} + B_c \text{sign}(\omega) + W \tag{1}$$

Assume the direction of the speed is known and is reflected by the sign of Bc.

An extra torque is included in the mechanical torque equation to keep the maximum speed operating point on the d-q coordinate system away from the current limit circle and the point where the constant torque curve and the voltage limit ellipse share a mutual tangent line (as described above in connection with FIG. 7). Considering this extra torque as a percentage of the motor rated torque, this transforms equation (1) to:

$$T_m = \frac{B_v \omega}{P_p} + B_c + W + \rho T_{rated} \tag{2}$$

Where ρ Is a percentage and $T_{rated}$ is the rated torque.

As the speed increases, the torque needed to overcome viscous friction of the motion system increases. Thus, the higher the speed, the more torque that is required to maintain the speed.

In the constant torque region, an SPMSM motor keeps the d-axis current at zero in order to get the maximum torque per ampere (MTPA). When the motor speed increases such that the voltage magnitude approaches the boundary of the space vector pulse width modulation (SVPWM) linear region, in order to allow the motor to run at higher speeds, a negative d-axis current can be applied to deflux the magnetic field, and the motor thereby enters the field-weakening region.

For IPMSM motors, a difference from the SPMSM approach is that negative d-axis current is required to achieve MTPA in the normal region. An MTPA curve from torque to d-axis and q-axis currents can be obtained with respect to d-axis and q-axis inductances Lsq and Lsd and rotor flux $\lambda_m$. In the field-weakening region, more d-axis current is needed in order to deflux the magnetic field and reach higher speed. The maximum torque per flux (MTPF) curve establishes the lower boundary for d-axis current.

For a PMSM motor model, at steady state, the voltage and flux equations are:

$$V_{sd} = R_s i_{sd} - \omega L_{sq} i_{sq} \tag{3}$$

$$V_{sq} = R_s i_{sq} + \omega(L_{sd} i_{sd} + \lambda_m) \tag{4}$$

The voltage and current limits of the system are:

$$V_{sd}^2 + V_{sq}^2 \leq V_{max}^2 \tag{5}$$

$$i_{sd}^2 + i_{sq}^2 \leq I_{max}^2 \tag{6}$$

The electrical torque Te is given by:

$$T_e = 1.5 P_p (\lambda_m + (L_{sd} - L_{sq}) i_{sd}) i_{sq} \tag{7}$$

The technique implemented by the speed operation range identification system 302 to determine the maximum speed for operation in the constant torque region is now described. In general, the MTPA is applied in the constant torque region in order to minimize the current. Therefore, a predefined MTPA curve establishes the unique mappings between the desired torque and the d-axis and q-axis current. These MPTA-based mappings may be defined and stored on the system 302 (e.g., in memory 314) in the form of a look-up table, or may be determined by the system based on an approximated polynomial expression obtained from measurement or via mathematical derivation and stored in memory 314, as represented by generalized equations (8) and (9) below:

$$i_{sd} = f_{sd,mtpa}(T_e) \tag{8}$$

$$i_{sq} = f_{sq,mtpa}(T_e) \tag{9}$$

Functions (8) and (9) yield, for a given torque Te, the point ($i_{sd}$, $i_{sq}$) corresponding to the intersection of the constant torque curve for Te and the MTPA curve for the modeled motion system.

If it is assumed that $$T = T_m = T_e \tag{10}$$

that is, the electrical torque Te is equal to the mechanical torque Tm, then equation (2) can be substituted into equations (8) and (9) to obtain:

$$i_{sd} = f_{sd,mtpa}\left(\frac{B_v \omega}{P_p} + B_c + W + \rho T_{rated}\right) \tag{11}$$

$$i_{sq} = f_{sq,mtpa}\left(\frac{B_v \omega}{P_p} + B_c + W + \rho T_{rated}\right) \tag{12}$$

In the particular case of a surface-mounted PMSM motor (SPMSM), for which the stator q-axis and d-axis inductances are equal (Lsd=Lsq), the stator d-axis and q-axis currents are given as:

$$i_{sd} = 0 \tag{13}$$

$$i_{sq} = \left(\frac{B_v \omega}{P_p} + B_c + W + \rho T_{rated}\right) \bigg/ (1.5 P_p \lambda_m) \tag{14}$$

For maximum speed in the constant torque region, the optimization problem is defined as:

$$\min(-\omega) \tag{15}$$

Subject to:

$$V_{sd} = R_s i_{sd} - \omega L_{sq} i_{sq} \tag{3}$$

$$V_{sq} = R_s i_{sq} + \omega(L_{sd} i_{sd} + \lambda_m) \tag{4}$$

$$i_{sd} = f_{sd,mtpa}\left(\frac{B_v \omega}{P_p} + B_c + W + \rho T_{rated}\right) \tag{11}$$

$$i_{sq} = f_{sq,mtpa}\left(\frac{B_v \omega}{P_p} + B_c + W + \rho T_{rated}\right) \tag{12}$$

$$V_{sd}^2 + V_{sq}^2 \leq V_{max}^2 \tag{5}$$

$$i_{sd}^2 + i_{sq}^2 \leq I_{max}^2 \tag{6}$$

In general, equations (3), (4), (5), and (6) are criteria that ensure the maximum voltage and current of the system are not exceeded, and equations (11) and (12) are criteria that place the d-axis and q-axis currents on the MTPA curve (note that, in the case of SPMSM motors, equations (11) and (12) can be replaced with equations (13) and (14)). The maximum speed determination component 310 of the speed operation range identification system 302 can thus determine the maximum speed for operation in the constant torque region by applying any suitable optimization method to solve the optimization problem (15) subject to equations (3), (4), (11), (12), (5), and (6). For example, in some embodiments the maximum speed determination component 310 may apply a Newton-Raphson optimization method to solve the optimization problem and thereby determine the maximum speed. As discussed above, the speed operation range identification system 302 can then provide this maximum speed value to another component of the control system (e.g., the speed control component 404 or the flux weakening component 410) to ensure that the control outputs to the motor do not produce speeds in excess of this maximum speed. In other embodiments, the system 302 may send the determined maximum speed to a separate motion control application, which can then adjust the limits of the motion profile generated by the motion control application to comply with this determined speed limit.

The technique implemented by the speed operation range identification system 302 to determine the maximum speed for operation in the constant power (field weakening) region is now described. As noted above, the motion system enters the constant power or field weakening region by applying a negative d-axis current in order to deflux the magnetic field and achieve higher speeds. In the present approach for determining the maximum speed for the constant power region, the MTPF curve is used to limit the lower bound of the d-axis current. To this end, the system 302 can store information describing a unique mapping between the d-axis and q-axis currents along the MTPF curve. This mapping information may be stored as a look-up table or other storage format in memory 314, or as an approximated polynomial expression obtained from measurement or mathematical derivation, as represented by:

$$i_{sd} = f_{sd,mtpf}(I_{sq}) \tag{16}$$

For the maximum speed in the constant power (field weakening) region, the optimization problem is defined as:

$$\min(-\omega) \tag{17}$$

Subject to:

$$V_{sd} = R_s i_{sd} - \omega L_{sq} i_{sq} \tag{3}$$

$$V_{sq} = R_s i_{sq} + \omega(L_{sd} i_{sd} + \lambda_m) \tag{4}$$

$$\frac{B_v \omega}{P_p} + B_c + W + \rho T_{rated} = 1.5 P_p (\lambda_m + (L_{sd} - L_{sq}) i_{sd}) i_{sq} \tag{18}$$

$$f_{sd,mtpf}(i_{sq}) - i_{sd} \leq 0 \tag{19}$$

$$i_{sd} \leq 0 \tag{20}$$

$$V_{sd}^2 + V_{sq}^2 \leq V_{max}^2 \tag{5}$$

$$i_{sd}^2 + i_{sq}^2 \leq I_{max}^2 \tag{6}$$

Equations (3), (4), (5), and (6) ensure the maximum voltage and current of the system are not exceeded. Equation (20) represents negative d-axis current in accordance with operation in the field weakening region. Equation (19) places a lower bound on the d-axis current corresponding to the MTPF curve (note that the MTPA curve is an upper bound in the field weakening region, but the optimal solution will always yield a value of d-axis current that is less than the MTPA curve, so this constrain is accounted for). As in the constant torque region, the maximum speed determination component 310 of the speed operation range identification system 302 can determine the maximum speed in the constant power region by applying any suitable optimization method to solve the optimization problem (17) subject to equations (3), (4), (18), (19), (20), (5), and (6). For example, in some embodiments the system may apply a Newton-Raphson optimization method to solve the optimization problem and thereby determine the maximum speed. As in the constant torque example described above, the speed operation range identification system 302 can then provide this maximum speed value to another component of the control system (e.g., the speed control component 404, the flux weakening component 410) or to a separate motion control application, which adjust their outputs in compliance with this maximum speed limit.

The examples above describe techniques for determining the maximum speed for motions systems that utilize a PMSM motor. Similar techniques can be used to determine a maximum operating speed for motion systems that include induction motors as well. Determination of a speed operation range for an induction motor is similar to the technique used for PMSMs, with modifications to allow for the fact that the magnetic field of an induction motor is generated from stator magnetizing current, rather than a permanent magnet as in the PMSM case.

Figure 9:
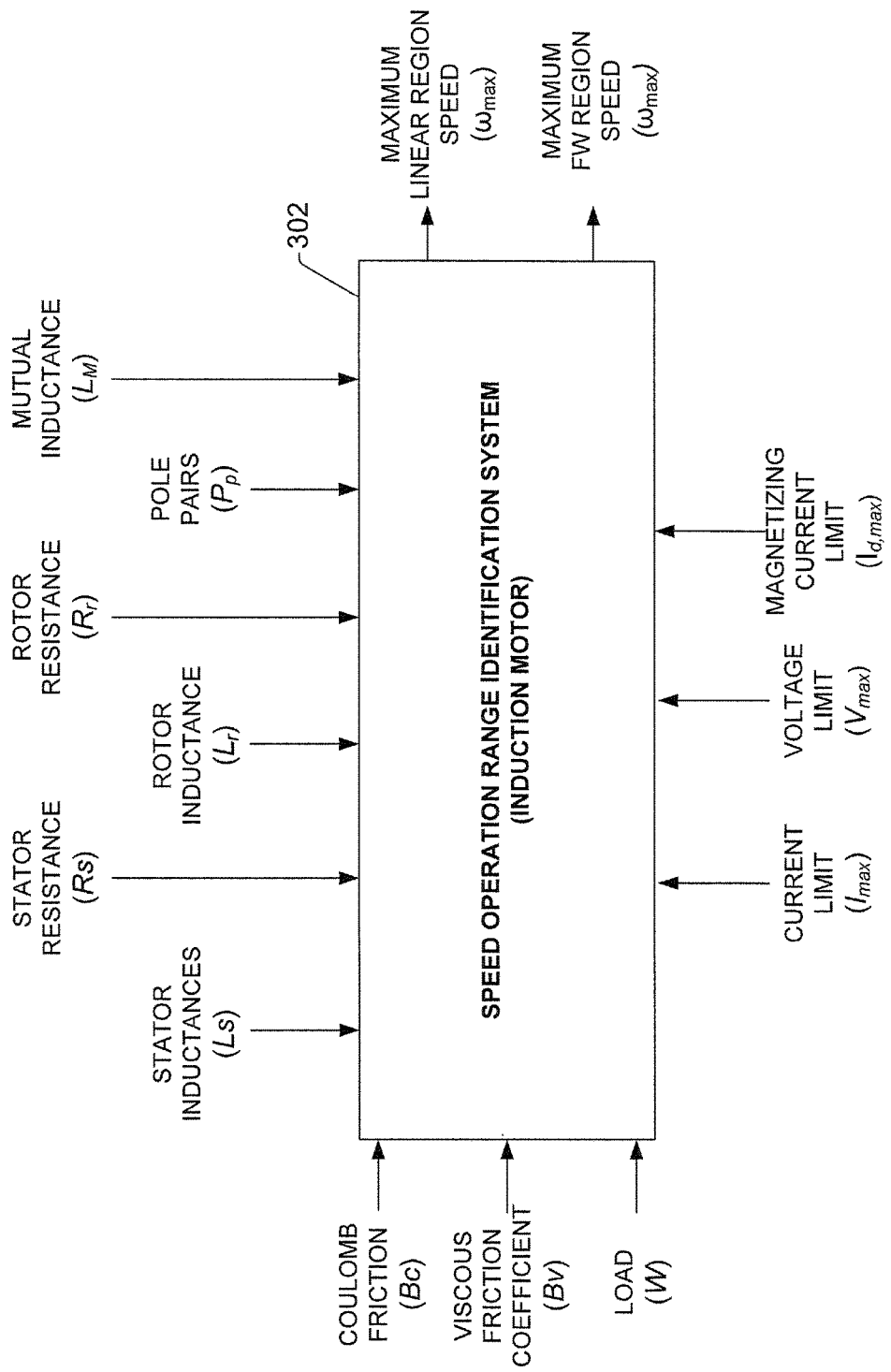
FIG. 9 is a diagram illustrating inputs and outputs of the speed operation range identification system for determination of maximum operating speeds for an induction motor motion system.

FIG. 9 is a diagram illustrating inputs and outputs of another embodiment of the speed operation range identification system 302 for motions systems using an induction motor (rather than a PMSM motor). Similar to the PMSM case, the system is provided with characteristic parameters of the induction (e.g., via input provided to the characteristic parameter input component 308), including the stator inductances Ls, the stator resistance $R_S$, the rotor inductance $L_r$, the rotor resistance $R_r$, the mutual inductance $L_m$, and the number of pole pairs Pp of the motor.

The current and voltage constraints $I_{max}$ and $V_{max}$ are also provided to the speed operation range identification system 302. In the induction motor case, the maximum magnetizing current $I_{d,max}$ of the induction motor is also provided to the system.

Also similar to the PMSM scenario, speed operation range identification system 302 is also provided with dominant motion parameters. Specifically, the system is provided with the Coulomb friction Bc and viscous friction coefficient Bv for the motion system. Estimates of the motion system's Coulomb friction Bc and viscous friction coefficient Bv can be determined using any suitable online parameter estimator. The load, which can be a measured constant value or allowable maximum value, is also provided to the speed operation range identification system 302.

The optimization algorithm carried out by the speed operation range identification system 302 for the induction motor case given these parameters is now described. At steady state, the voltage and flux equations of an induction motor model can be given as:

$$V_{sd} = R_s i_{sd} - (\omega + \omega_{sl}) \sigma L_s i_{sq} \tag{21}$$

$$V_{sq} = R_s i_{sq} + (\omega + \omega_{sl}) L_s i_{sd} \tag{22}$$

$$\omega_{sl} = \frac{R_r}{L_r} \frac{i_{sq}}{i_{sd}} \tag{23}$$

Where σ is a leakage factor of the induction motor, and is given by:

$$\sigma = 1 - \frac{L_m^2}{L_r L_s} \tag{24}$$

As in the PMSM case, the voltage and current limits of the induction motor system can be given as:

$$V_{sd}^2 + V_{sq}^2 \leq V_{max}^2 \tag{5}$$

$$i_{sd}^2 + i_{sq}^2 \leq I_{max}^2 \tag{6}$$

The electrical torque T can be given as:

$$T = \frac{3}{2} P_p \frac{L_m^2}{L_r} i_{sd} i_{sq} \tag{25}$$

The technique implemented by the speed operation range identification system 302 to determine the maximum speed for operation in the constant torque region for the induction motor scenario is now described. The MTPA is applied in the constant torque region to minimize the current. The flux of the induction motor is controlled through magnetizing current. The MTPA solution in the constant torque region is $$i_{sd} = i_{sq} \tag{26}$$

which, given equation (23) above, implies that $$\omega_{sl} = \frac{R_r}{L_r} \tag{27}$$

For the maximum speed in the constant torque region, the optimization problem can be defined as:

$$\min(-\omega) \tag{28}$$

Subject to:

$$V_{sd} = R_s i_{sd} - (\omega + \omega_{sl})\sigma L_s i_{sq} \tag{21}$$

$$V_{sq} = R_s i_{sq} + (\omega + \omega_{sl})L_s i_{sd} \tag{22}$$

$$\omega_{sl} = \frac{R_r}{L_r} \tag{27}$$

$$i_{sd} = i_{sq} \tag{26}$$

$$\frac{B_v \omega}{P_p} + B_c + W + \rho T_{rated} = \frac{3}{2} P_p \frac{L_m^2}{L_r} i_{sd} i_{sq} \tag{29}$$

$$V_{sd}^2 + V_{sq}^2 \leq V_{max}^2 \tag{5}$$

$$i_{sd}^2 + i_{sq}^2 \leq I_{max}^2 \tag{6}$$

$$i_{sd} \leq I_{d,max} \tag{30}$$

Equations (21), (22), (5), (6), and (30) ensure that the maximum voltage and current of the system are not exceeded. Equation (26) enforces the MTPA solution in the constant torque region. As in previous examples, the maximum speed determination component 310 of the speed operation range identification system 302 can determine the maximum speed in the constant torque region by applying any suitable optimization method to solve the optimization problem (26) subject to equations (21), (22), (27), (26), (29), (5), (6), and (30). For example, in some embodiments the system may apply a Newton-Raphson optimization method to solve the optimization problem and thereby determine the maximum speed. As in the PMSM examples described above, the speed operation range identification system 302 can then provide this maximum speed value for the induction motor system to another component of the control system or to a separate motion control application, which adjust their outputs in compliance with this maximum speed limit.

The technique implemented by some embodiments of the speed operation range identification system 302 to determine the maximum speed for operation in the constant power (field weakening) region for motion systems including induction motors is now described. In the field weakening region, $i_{sd}$ is reduced to allow the increase of speed with the tradeoff of torque. Thus, unlike the constant torque region solution, $i_{sd}$ is not equal to $i_{sq}$, and equation (23) replaces equation (27) in the solution. For the maximum speed in the constant power (field weakening) region, the optimization problem is defined as:

$$\min(-\omega) \tag{31}$$

Subject to:

$$V_{sd} = R_s i_{sd} - (\omega + \omega_{sl})\sigma L_s i_{sq} \tag{21}$$

$$V_{sq} = R_s i_{sq} + (\omega + \omega_{sl})L_s i_{sd} \tag{22}$$

$$\omega_{sl} = \frac{R_r}{L_r} \frac{i_{sq}}{i_{sd}} \tag{23}$$

$$\frac{B_v \omega}{P_p} + B_c + W + \rho T_{rated} = \frac{3}{2} P_p \frac{L_m^2}{L_r} i_{sd} i_{sq} \tag{28}$$

$$V_{sd}^2 + V_{sq}^2 \leq V_{max}^2 \tag{5}$$

$$i_{sd}^2 + i_{sq}^2 \leq I_{max}^2 \tag{6}$$

$$i_{sd} \leq I_{d,max} \tag{30}$$

As in previous examples, a Newton-Raphson optimization, or any other suitable optimization method can be used to solve the optimization problem (30) subject to equations (21), (22), (23), (28), (5), (6), and (30).

Figure 10:
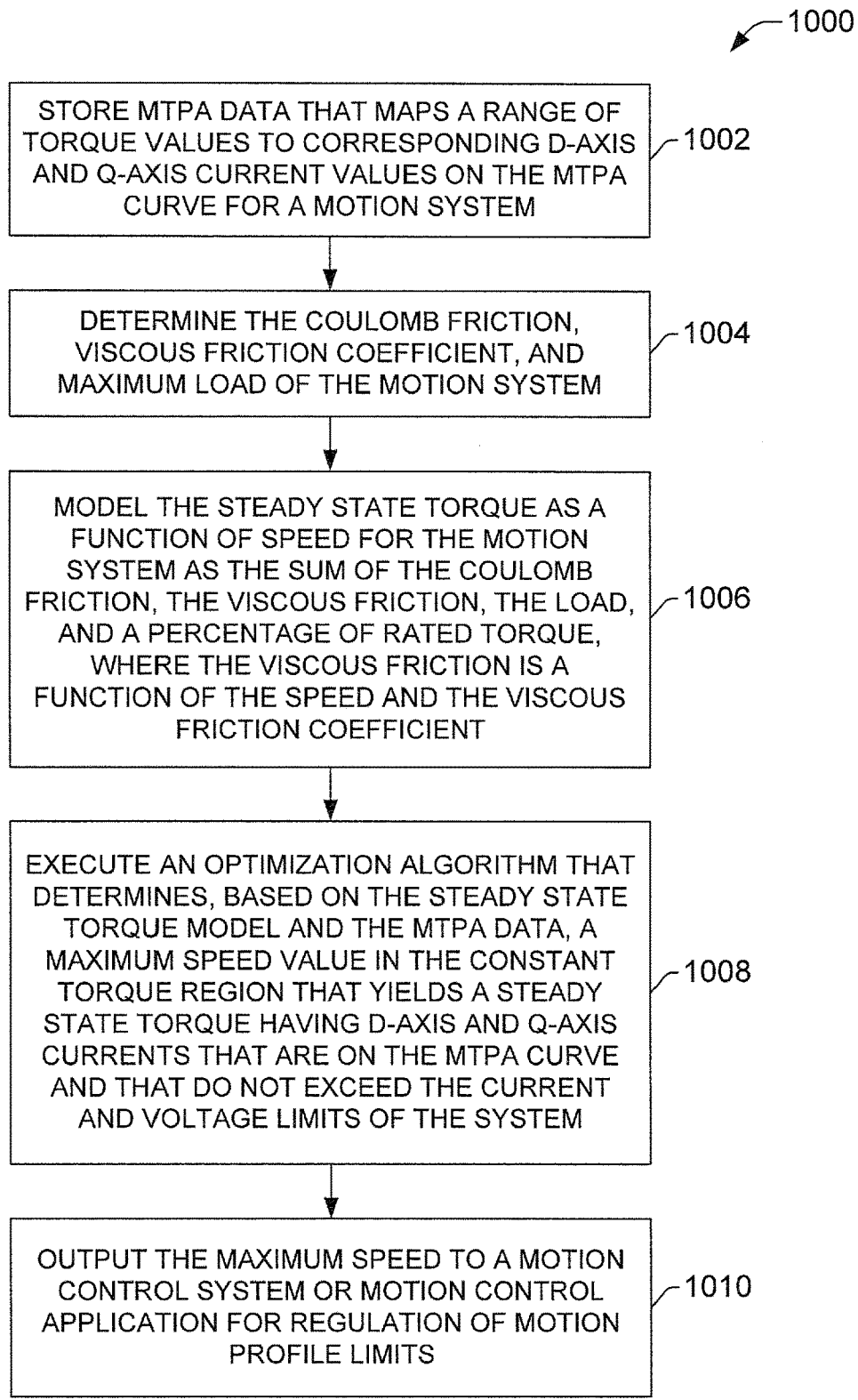
FIG. 10 is a flowchart of an example methodology for dynamically determining a maximum speed value for operation of a motion system in the constant torque (normal speed) region.
Figure 11:
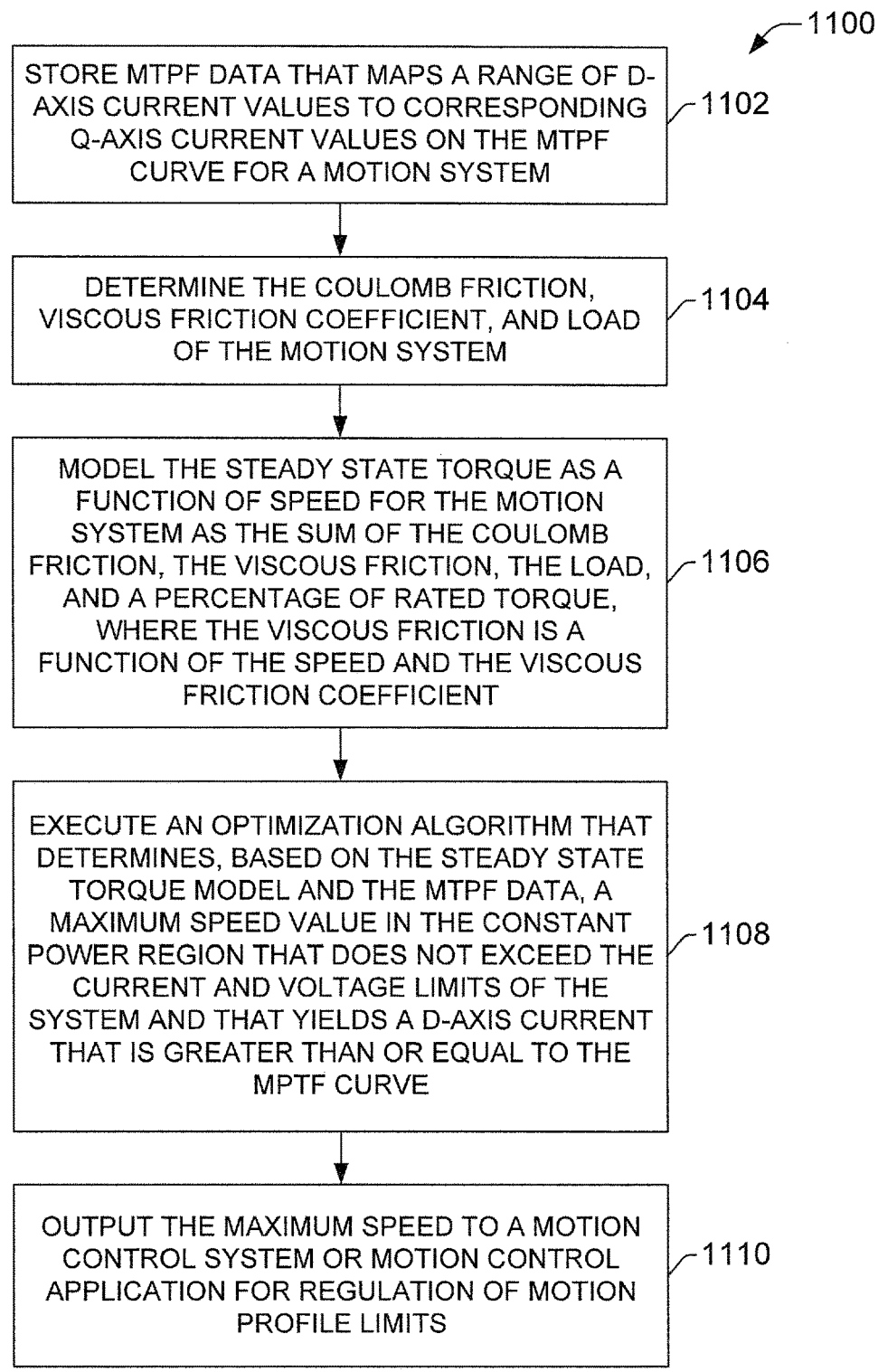
FIG. 11 a flowchart of an example methodology for dynamically determining a maximum speed value for operation of a motion system in the constant power (field weakening) region.

FIGS. 10-11 illustrate example methodologies in accordance with certain disclosed aspects. While, for purposes of simplicity of explanation, the methodologies are shown and described as a series of acts, it is to be understood and appreciated that the disclosed aspects are not limited by the order of acts, as some acts may occur in different orders and/or concurrently with other acts from that shown and described herein. For example, those skilled in the art will understand and appreciate that a methodology can alternatively be represented as a series of interrelated states or events, such as in a state diagram. Moreover, not all illustrated acts may be required to implement a methodology in accordance with certain disclosed aspects. Additionally, it is to be further appreciated that the methodologies disclosed hereinafter and throughout this disclosure are capable of being stored on an article of manufacture to facilitate transporting and transferring such methodologies to computers.

FIG. 10 is a flowchart of an example methodology 1000 for dynamically determining a maximum speed value for operation of a motion system in the constant torque (normal speed) region. Initially, at 1002, MTPA data for a motion system is stored for reference, where the MTPA data maps a range of torque values to corresponding d-axis and q-axis current values on the MTPA curve for the motion system. In some embodiments, this MTPA data may be stored as a look-up table that defines correspondences between desired torque values and points ($i_{sd}$, $i_{sq}$) on the MTPA curve; that is, the d-axis and q-axis values that yield the maximum torque per ampere for the given desired torque, based on the intersection of the constant torque curve for the desired torque and the MTPA curve for the motion system. In other embodiments, the MTPA data may be stored as an approximated polynomial expression obtained from measurement or mathematical derivation (e.g., as represented by equations (8) and (9) above), such that providing a value of the desired torque to the expression will yield the corresponding point ($i_{sd}$, $i_{sq}$) on the MTPA curve.

At 1004, the coulomb friction, viscous friction coefficient, and load of the motion system are determined. One or more of these values can be determined, for example, using an online motor/motion parameter estimator that determines these friction and load values based on measurements taking on the motion system during operation. Alternatively, one or more of the values can be determined separately and provided by a system designer. At 1006, the steady state torque of the motion system is modeled as a function of speed. In particular, the steady state torque is modeled as the sum of the motion system's coulomb friction, viscous friction (which is a variable function of speed; e.g., the product of speed and the viscous friction coefficient divided by the number of pole pairs), load, and a percentage of the rated torque representing a reserved extra toque. Since the viscous friction is a dynamic function of the speed of the motion system (e.g., the product of the speed and the viscous friction coefficient determined at step 1004 divided by the number of pole pairs), the resulting torque model will be a function of the speed of the motion system (e.g., as represented by equation (2) above).

At 1008, an optimization algorithm is executed that determines, based on the steady state torque model yielded at step 1006 and the MTPA data stored at step 1002, a maximum speed value for operation of the motion system in the constant torque region that yields a steady state torque having d-axis and q-axis currents that are on the MTPA curve and that do not cause the motion system to exceed the current and voltage constraints of the motion system (as determined based on characteristic parameters of the motor, including the q-axis and d-axis stator inductances, the stator resistance, and the rotor flux). In an example technique, this maximum speed can be determined by finding the maximum speed subject to equations (3), (4), (11), (12), (5), and (6) above.

At 1010, the maximum speed determined at step 1008 is output to a motion control system or a motion control application for regulation of motion profile limits. For example, the determined maximum speed value may be used by a motion control application that generates motion profiles for control of the motor to limit the maximum speed set by the motion profiles, where the maximum speed is used to limit the speed while operating in the constant torque region. In another example, the maximum speed value may be provided to the speed controller and/or flux weakening controllers of a motor control system that translates the speed reference signal defined by the motion profiles into reference currents that control the motor control output signal. In such examples, the controllers may use the determined maximum speed to regulate the q-axis and/or d-axis current to ensure that the control output signal does not exceed the maximum speed while operating in the constant torque region.

FIG. 11 is a flowchart of an example methodology 1100 for dynamically determining a maximum speed value for operation of a motion system in the constant power (field weakening) region. Initially, at 1102, MTPF data is stored that maps a range of d-axis current values to corresponding q-axis current values on the MTPF curve for the motion system. This MTPF data may be stored in the form of a look-up table that defines correspondences between q-axis current values and respective d-axis current values that place the point $(i_{sd}, i_{sq})$ on the MTPF curve for the motion system. Alternatively, the MTPF data may be stored as an approximated polynomial expression (as represented by equation (16) above).

At 1104, the coulomb friction, the viscous friction coefficient, and the load of the motion system is determined, in a manner similar to step 1004 of methodology 1000 above. At 1106, the steady state torque is modeled as a function of speed for the motion system, in a manner similar to step 1006 of methodology 1000. At 1108, an optimization algorithm is executed that determines, based on the steady state torque model and the MTPF data, a maximum speed value for operation of the motion system in the constant power region that does not cause the motion system to exceed the voltage and current constraints (as determined by the characteristic parameters of the motor, including the q-axis and d-axis stator inductances, the stator resistance, and the rotor flux), and that yields a d-axis current that is greater than or equal to the MTPF curve. That is, the optimization algorithm uses the MTPF curve of the motion system as a lower bound on the d-axis current when determining the maximum speed for operation in the field weakening region. At 1110, the maximum speed value determined at step 1108 is output to a motion control system or a motion control application for regulation of motion profile limits, in a similar manner to step 1010 of methodology 1000.

Exemplary Networked and Distributed Environments

One of ordinary skill in the art can appreciate that the various embodiments described herein can be implemented in connection with any computer or other client or server device, which can be deployed as part of a computer network or in a distributed computing environment, and can be connected to any kind of data store where media may be found. In this regard, the various embodiments of the speed operation range identification system described herein can be implemented in any computer system or environment having any number of memory or storage units (e.g., memory 314 of FIG. 3), and any number of applications and processes occurring across any number of storage units. This includes, but is not limited to, an environment with server computers and client computers deployed in a network environment or a distributed computing environment, having remote or local storage. For example, with reference to FIG. 3, friction input component 304, load input component 306, characteristic parameter input component 308, and maximum speed determination component 310 can be stored on a single memory 314 associated with a single device, or can be distributed among multiple memories associated with respective multiple devices. Similarly, friction input component 304, load input component 306, characteristic parameter input component 308, and maximum speed determination component 310 can be executed by a single processor 312, or by multiple distributed processors associated with multiple devices.

Distributed computing provides sharing of computer resources and services by communicative exchange among computing devices and systems. These resources and services include the exchange of information, cache storage and disk storage for objects. These resources and services can also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the various embodiments of this disclosure.

Figure 12:
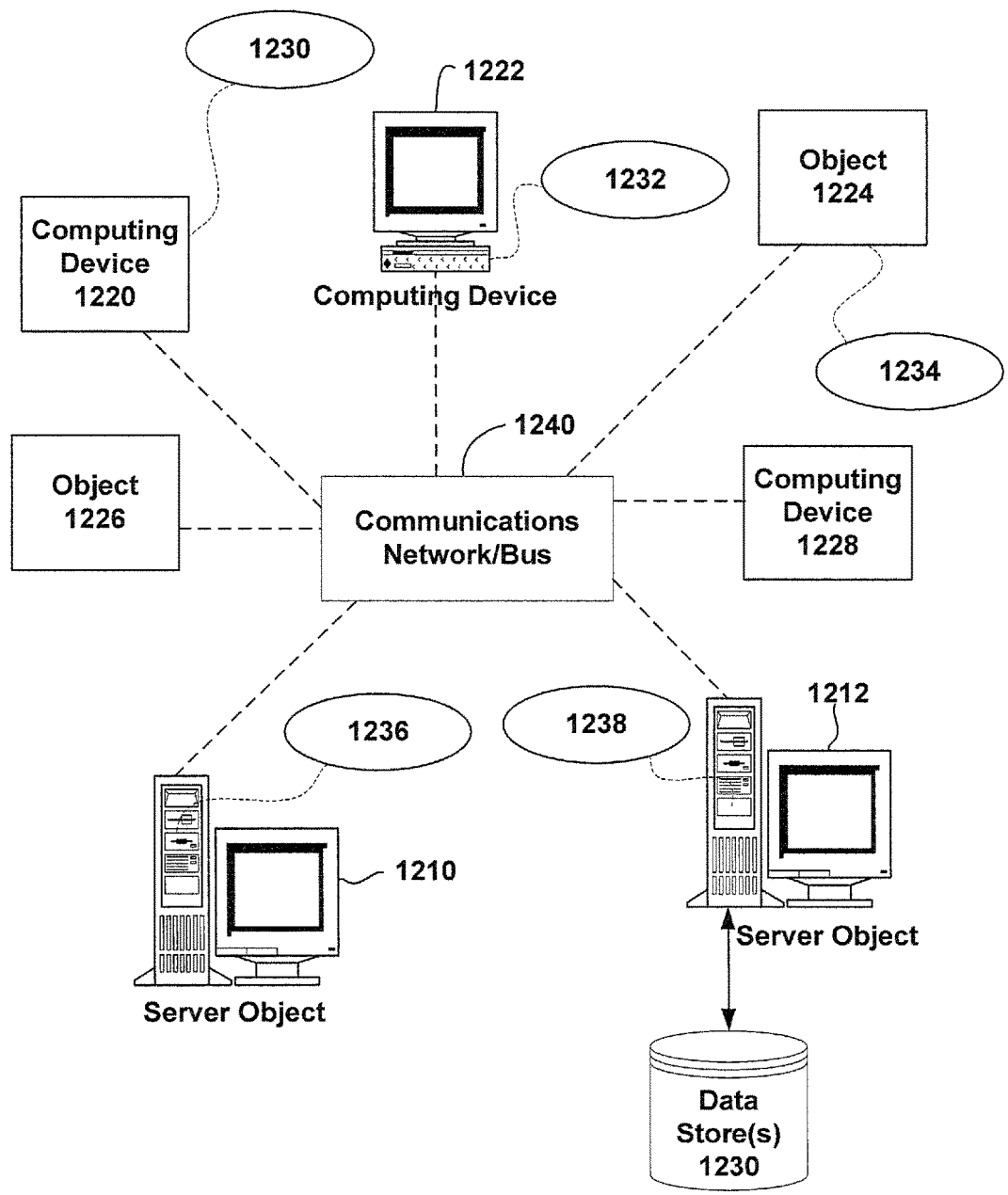
FIG. 12 is a block diagram representing an exemplary networked or distributed computing environment for implementing one or more embodiments described herein.

FIG. 12 provides a schematic diagram of an exemplary networked or distributed computing environment. The distributed computing environment includes computing objects 1210, 1212, etc. and computing objects or devices 1220, 1222, 1224, 1226, 1228, etc., which may include programs, methods, data stores, programmable logic, etc., as represented by applications 1230, 1232, 1240, 1236, 1238. It can be appreciated that computing objects 1210, 1212, etc. and computing objects or devices 1220, 1222, 1224, 1226, 1228, etc. may comprise different devices, such as personal digital assistants (PDAs), audio/video devices, mobile phones, MP3 players, personal computers, laptops, tablets, etc., where embodiments of the speed operation range identification system described herein may reside on or interact with such devices.

Each computing object 1210, 1212, etc. and computing objects or devices 1220, 1222, 1224, 1226, 1228, etc. can communicate with one or more other computing objects 1210, 1212, etc. and computing objects or devices 1220, 1222, 1224, 1226, 1228, etc. by way of the communications network 1240, either directly or indirectly. Even though illustrated as a single element in FIG. 12, communications network 1240 may comprise other computing objects and computing devices that provide services to the system of FIG. 12, and/or may represent multiple interconnected networks, which are not shown. Each computing object 1210, 1212, etc. or computing objects or devices 1220, 1222, 1224, 1226, 1228, etc. can also contain an application, such as applications 1230, 1232, 1240, 1236, 1238, that might make use of an API, or other object, software, firmware and/or hardware, suitable for communication with or implementation of various embodiments of this disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any suitable network infrastructure can be used for exemplary communications made incident to the systems as described in various embodiments herein.

Thus, a host of network topologies and network infrastructures, such as client/server, peer-to-peer, or hybrid architectures, can be utilized. The "client" is a member of a class or group that uses the services of another class or group. A client can be a computer process, e.g., roughly a set of instructions or tasks, that requests a service provided by another program or process. A client process may utilize the requested service without having to "know" all working details about the other program or the service itself.

In a client/server architecture, particularly a networked system, a client can be a computer that accesses shared network resources provided by another computer, e.g., a server. In the illustration of FIG. 12, as a non-limiting example, computing objects or devices 1220, 1222, 1224, 1226, 1228, etc. can be thought of as clients and computing objects 1210, 1212, etc. can be thought of as servers where computing objects 1210, 1212, etc. provide data services, such as receiving data from client computing objects or devices 1220, 1222, 1224, 1226, 1228, etc., storing of data, processing of data, transmitting data to client computing objects or devices 1220, 1222, 1224, 1226, 1228, etc., although any computer can be considered a client, a server, or both, depending on the circumstances. Any of these computing devices may be processing data, or requesting transaction services or tasks that may implicate the techniques for systems as described herein for one or more embodiments.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the techniques described herein can be provided standalone, or distributed across multiple computing devices or objects.

In a network environment in which the communications network/bus 1240 is the Internet, for example, the computing objects 1210, 1212, etc. can be Web servers, file servers, media servers, etc. with which the client computing objects or devices 1220, 1222, 1224, 1226, 1228, etc. communicate via any of a number of known protocols, such as the hypertext transfer protocol (HTTP). Computing objects 1210, 1212, etc. may also serve as client computing objects or devices 1220, 1222, 1224, 1226, 1228, etc., as may be characteristic of a distributed computing environment.

Exemplary Computing Device

Figure 13:
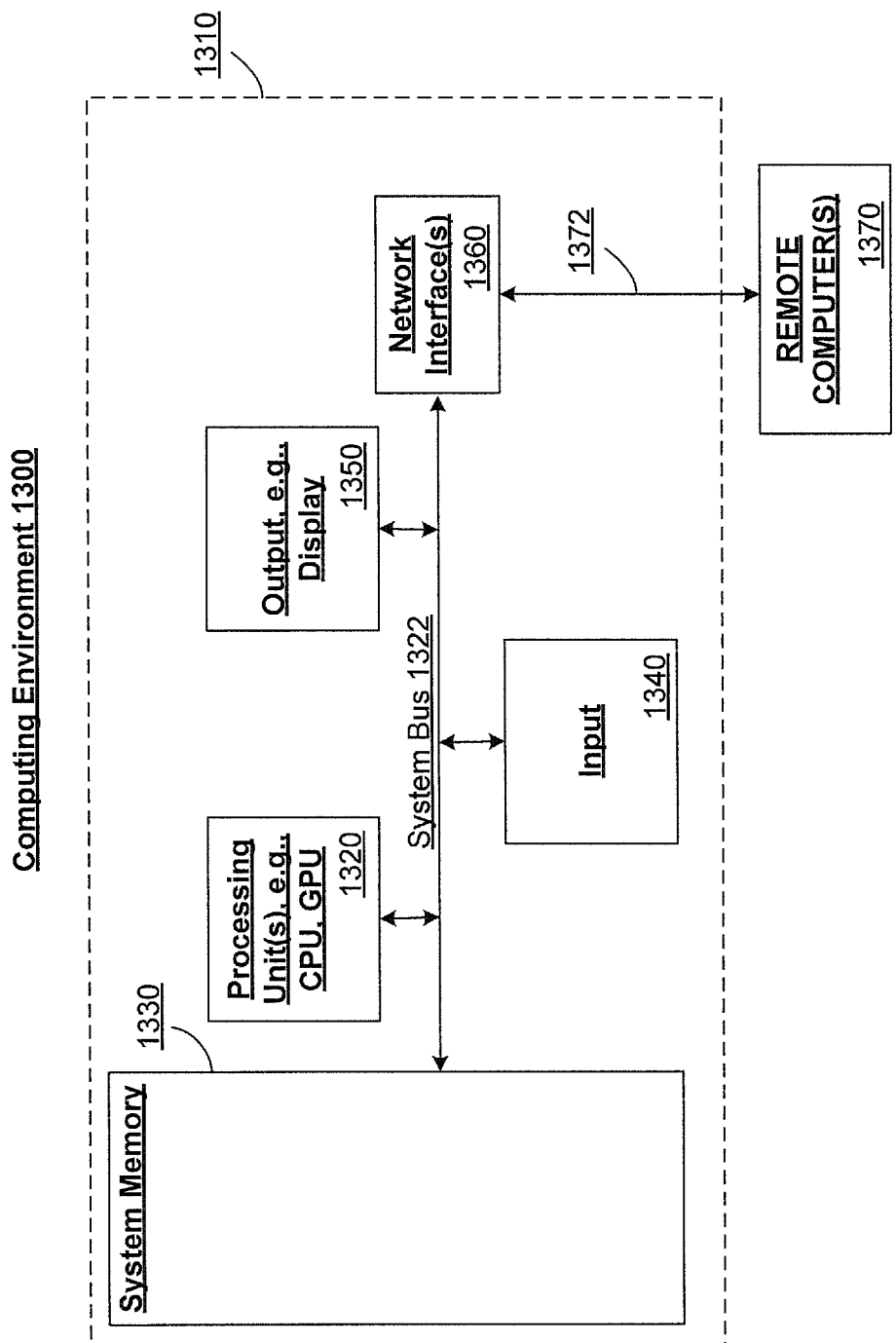
FIG. 13 is a block diagram representing an exemplary computing system or operating environment for implementing one or more embodiments described herein.

As mentioned, advantageously, the techniques described herein can be applied to any suitable device. It is to be understood, therefore, that handheld, portable and other computing devices and computing objects of all kinds are contemplated for use in connection with the various embodiments. Accordingly, the below computer described below in FIG. 13 is but one example of a computing device. Additionally, a suitable server can include one or more aspects of the below computer, such as a media server or other media management server components.

Although not required, embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is to be considered limiting.

FIG. 13 thus illustrates an example of a suitable computing system environment 1300 in which one or aspects of the embodiments described herein can be implemented, although as made clear above, the computing system environment 1300 is only one example of a suitable computing environment and is not intended to suggest any limitation as to scope of use or functionality. Neither is the computing system environment 1300 be interpreted as having any dependency or requirement relating to any one or combination of components illustrated in the exemplary computing system environment 1300.

With reference to FIG. 13 an exemplary computing device for implementing one or more embodiments in the form of a computer 1310 is depicted. Components of computer 1310 may include, but are not limited to, a processing unit 1320, a system memory 1330, and a system bus 1322 that couples various system components including the system memory to the processing unit 1320. Processing unit 1320 may, for example, perform functions associated with processor(s) 312 of speed operation range identification system 302, while system memory 1330 may perform functions associated with memory 314.

Computer 1310 typically includes a variety of computer readable media and can be any available media that can be accessed by computer 1310. The system memory 1330 may include computer storage media in the form of volatile and/or nonvolatile memory such as read only memory (ROM) and/or random access memory (RAM). By way of example, and not limitation, system memory 1330 may also include an operating system, application programs, other program modules, and program data.

A user can enter commands and information into the computer 1310 through input devices 1340, non-limiting examples of which can include a keyboard, keypad, a pointing device, a mouse, stylus, touchpad, touchscreen, trackball, motion detector, camera, microphone, joystick, game pad, scanner, or any other device that allows the user to interact with computer 1310. A monitor or other type of display device is also connected to the system bus 1322 via an interface, such as output interface 1350. In addition to a monitor, computers can also include other peripheral output devices such as speakers and a printer, which may be connected through output interface 1350. In one or more embodiments, input devices 1340 can provide user input to speed operation range identification system 302, while output interface 1350 can receive and display information relating to operations of speed operation range identification system 302.

The computer 1310 may operate in a networked or distributed environment using logical connections to one or more other remote computers, such as remote computer 1370. The remote computer 1370 may be a personal computer, a server, a router, a network PC, a peer device or other common network node, or any other remote media consumption or transmission device, and may include any or all of the elements described above relative to the computer 1310. The logical connections depicted in FIG. 13 include a network 1372, such local area network (LAN) or a wide area network (WAN), but may also include other networks/buses e.g., cellular networks.

As mentioned above, while exemplary embodiments have been described in connection with various computing devices and network architectures, the underlying concepts may be applied to any network system and any computing device or system in which it is desirable to publish or consume media in a flexible way.

Also, there are multiple ways to implement the same or similar functionality, e.g., an appropriate API, tool kit, driver code, operating system, control, standalone or downloadable software object, etc. which enables applications and services to take advantage of the techniques described herein. Thus, embodiments herein are contemplated from the standpoint of an API (or other software object), as well as from a software or hardware object that implements one or more aspects described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the aspects disclosed herein are not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

Computing devices typically include a variety of media, which can include computer-readable storage media (e.g., memory 314) and/or communications media, in which these two terms are used herein differently from one another as follows. Computer-readable storage media can be any available storage media that can be accessed by the computer, is typically of a non-transitory nature, and can include both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As mentioned, the various techniques described herein may be implemented in connection with hardware or software or, where appropriate, with a combination of both. As used herein, the terms "component," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers. Further, a "device" can come in the form of specially designed hardware; generalized hardware made specialized by the execution of software thereon that enables the hardware to perform specific function (e.g., coding and/or decoding); software stored on a computer readable medium; or a combination thereof.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it is to be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In order to provide for or aid in inferences described herein, components described herein can examine the entirety or a subset of the data to which it is granted access and can provide for reasoning about or infer states of the system, environment, etc. from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines, etc.) can be employed in connection with performing automatic and/or inferred action in connection with the claimed subject matter.

A classifier can map an input attribute vector, $x=(x1, x2, x3, x4, xn)$, to a confidence that the input belongs to a class, as by $f(x)=\text{confidence(class)}$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

In view of the exemplary systems described above, methodologies that may be implemented in accordance with the described subject matter will be better appreciated with reference to the flowcharts of the various figures (e.g., FIGS. 10-11). While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, not all illustrated blocks may be required to implement the methodologies described hereinafter.

In addition to the various embodiments described herein, it is to be understood that other similar embodiments can be used or modifications and additions can be made to the described embodiment(s) for performing the same or equivalent function of the corresponding embodiment(s) without deviating there from. Still further, multiple processing chips or multiple devices can share the performance of one or more functions described herein, and similarly, storage can be effected across a plurality of devices. Accordingly, the invention is not to be limited to any single embodiment, but rather can be construed in breadth, spirit and scope in accordance with the appended claims.

What is claimed is:

1. A system for determining maximum speed for a motion system, comprising:
    a memory that stores executable components and mapping data that maps a range of torque values corresponding to d-axis current values and q-axis current values of a motion system; and
    a processor configured to execute the executable components stored on the memory, the executable components comprising:
        a friction input component configured to determine a Coulomb friction and a viscous friction coefficient for the motion system;
        a load input component configured to determine a load on the motion system; and
        a maximum speed determination component configured to
            generate, based on the Coulomb friction, the viscous friction coefficient, and the load, a steady state torque model that models steady state torque for the motion system as a function of a speed of the motion system,
            determine, based on an optimization routine performed on the mapping data and the steady state torque model, a maximum speed value for operation of the motion system that yields stator currents and voltages that are equal to or less than respective current and voltage limits of a motor that drives the motion system, and
            output the maximum speed value to at least one of a motion controller or a motion control application that facilitates control of the motion system,
    wherein the at least one of the motion controller or the motion control application regulates at least one of a q-axis current reference signal or a d-axis current reference signal used to control the motion system based on the maximum speed value.

2. The system of claim 1, wherein
    the maximum speed value is a first maximum speed value for operation of the motion system in a normal speed region,
    the mapping data is first mapping data,
    the memory further stores second mapping data that maps a range of d-axis current values corresponding to q-axis current values for the motion system, and
    the maximum speed determination component is further configured to
        determine, based on another optimization routine performed on the second mapping data and the steady state torque model, a second maximum speed value for operation of the motion system in a field weakening region that yields stator voltages and stator currents that are equal to or less than the current and voltage limits of the motion system.

3. The system of claim 1, wherein the maximum speed determination component is configured to determine the maximum speed value during operation of the motion system.

4. The system of claim 1, wherein the maximum speed determination component is configured to determine, as the maximum speed value, a maximum speed value for operation of the motion system in a normal speed region, that yields a steady state torque that produce d-axis and q-axis currents that correspond to a maximum torque per ampere (MTPA) curve for the motion system and that do not exceed the current and voltage limits of the motion system.

5. The system of claim 4, wherein the motor is a permanent magnet synchronous motor (PMSM), and the maximum speed determination component is configured to set the maximum speed value for operation in the normal speed region equal to a value of motor speed ω that solves $$\min(-\omega)$$

subject to $$V_{sd} = R_s i_{sd} - \omega L_{sq} i_{sq}$$

$$V_{sq} = R_s i_{sq} + \omega(L_{sd} i_{sd} + \lambda_m)$$

$$i_{sd} = f_{sd,mtpa}\left(\frac{B_v \omega}{P_p} + B_c + W + \rho T_{rated}\right)$$

$$i_{sq} = f_{sq,mtpa}\left(\frac{B_v \omega}{P_p} + B_c + W + \rho T_{rated}\right)$$

$$V_{sd}^2 + V_{sq}^2 \leq V_{max}^2$$

$$I_{sd}^2 + I_{sq}^2 \leq I_{max}^2$$

where
$V_{sd}$ is a stator d-axis voltage for the PMSM,
$V_{sq}$ is a stator q-axis voltage for the PMSM,
$i_{sd}$ is a stator d-axis current for the PMSM,
$i_{sq}$ is a stator q-axis current for the PMSM,
$V_{max}$ is a voltage limit for the PMSM,
$I_{max}$ is a current limit for the PMSM,
$R_s$ is a stator resistance of the PMSM,
$L_{sq}$ is a stator q-axis inductance of the PMSM,
$L_{sd}$ is a stator d-axis inductance of the PMSM,
$\lambda_m$ is a rotor flux of the PMSM,
$B_v$ is the viscous friction coefficient,
$B_c$ is the Coulomb friction,
W is the load, wherein the load is one of a constant load on the motion system or a maximum load on the motion system,
$\rho T_{rated}$ is a percentage of a rated torque of the PMSM,
$P_p$ is a number of pole pairs of the PMSM,
$f_{sd,mtpa}(T)$ is a function that defines, as a first portion of the mapping data, values of the stator d-axis current on the MTPA curve corresponding to respective values of torque T, and
$f_{sq,mtpa}(T)$ is a function that defines, as a second portion of the mapping data, values of the stator q-axis current on the MTPA curve corresponding to respective values of the torque T.

6. The system of claim 2, wherein the maximum speed determination component is configured to determine, as the second maximum speed value for the operation of the motion system in the field weakening region, a maximum speed that does not cause the motor to exceed the current and voltage limits of the motion system and that yields a d-axis current that is greater than or equal to a maximum torque per flux (MTPF) curve of the motion system.

7. The system of claim 6, wherein the motor is a permanent magnet synchronous motor (PMSM), and the maximum speed determination component is configured to set the second maximum speed value for the operation in the field weakening region equal to a value of motor speed ω that solves $$\min(-\omega)$$

subject to $$V_{sd} = R_s i_{sd} - \omega L_{sq} i_{sq}$$

$$V_{sq} = R_s i_{sq} + \omega(L_{sd} i_{sd} + \lambda_m)$$

$$\frac{B_v \omega}{P_p} + B_c + W + \rho T_{rated} = 1.5 P_p(\lambda_m + (L_{sd} - L_{sq})i_{sd})i_{sq}$$

$$f_{sd,mtpf}(i_{sq}) - i_{sd} \leq 0$$

$$i_{sd} \leq 0$$

$$V_{sd}^2 + V_{sq}^2 \leq V_{max}^2$$

$$i_{sd}^2 + i_{sq}^2 \leq I_{max}^2$$

where
$V_{sd}$ is a stator d-axis voltage for the PMSM,
$V_{sq}$ is a stator q-axis voltage for the PMSM,
$i_{sd}$ is a stator d-axis current for the PMSM,
$i_{sq}$ is a stator q-axis current for the PMSM,
$V_{max}$ is a voltage limit for the PMSM,
$I_{max}$ is a current limit for the PMSM,
$R_s$ is a stator resistance of the PMSM,
$L_{sq}$ is a stator q-axis inductance of the PMSM,
$L_{sd}$ is a stator d-axis inductance of the PMSM,
$\lambda_m$ is a rotor flux of the PMSM,
$B_v$ is the viscous friction coefficient,
$B_c$ is the Coulomb friction,
W is the load, wherein the load is one of a constant load on the motion system or a maximum load on the motion system,
$\rho T_{rated}$ is a percentage of a rated torque of the PMSM,
$P_p$ is a number of pole pairs of the PMSM, and
$f_{sd,mtpf}(i_{sq})$ is a function that defines, as the second mapping data, values of the stator d-axis current on the MTPF curve corresponding to values of the stator q-axis current $i_{sq}$.

8. The system of claim 4, wherein the motor is an induction motor, and the maximum speed determination component is configured to set the maximum speed value for the operation in the normal speed region equal to a value of motor speed ω that solves $$\min(-\omega)$$

subject to $$V_{sd} = R_s i_{sd} - (\omega + \omega_{sl})\sigma L_s i_{sq}$$

$$V_{sq} = R_s i_{sq} + (\omega + \omega_{sl}) L_s i_{sd}$$

$$\omega_{sl} = \frac{R_r}{L_r}$$

$$i_{sd} = i_{sq}$$

$$\frac{B_v \omega}{P_p} + B_c + W + \rho T_{rated} = \frac{3}{2} P_p \frac{L_m^2}{L_r} i_{sd} i_{sq}$$

$$V_{sd}^2 + V_{sq}^2 \leq V_{max}^2$$

$$i_{sd}^2 + i_{sq}^2 \leq I_{max}^2$$

$$i_{sd} \leq I_{d,max}$$

where
$V_{sd}$ is a stator d-axis voltage for the induction motor,
$V_{sq}$ is a stator q-axis voltage for the induction motor,
$i_{sd}$ is a stator d-axis current for the induction motor,
$i_{sq}$ is a stator q-axis current for the induction motor,
$V_{max}$ is a voltage limit for the induction motor,
$I_{max}$ is a current limit for the induction motor,
$R_s$ is a stator resistance of the induction motor,
$R_r$ is a rotor resistance of the induction motor,
$L_s$ is a stator inductance of the induction motor,
$L_r$ is a rotor inductance of the induction motor,
$L_m$ is a mutual inductance of the induction motor,
σ is a leakage factor of the induction motor,
$B_v$ is the viscous friction coefficient,
$B_c$ is the Coulomb friction,
W is the load, wherein the load is one of a constant load on the motion system or a maximum load on the motion system,
$\rho T_{rated}$ is a percentage of a rated torque of the induction motor,
$P_p$ is a number of pole pairs of the induction motor, and
$\omega_{sl}$ is a slip frequency of the induction motor.

9. The system of claim 6, wherein the motor is an induction motor, and the maximum speed determination component is configured to set the second maximum speed value for the operation of the motion system in the field weakening region equal to a value of motor speed ω that solves min(–ω)

subject to $$V_{sd} = R_s i_{sd} - (\omega + \omega_{sl})\sigma L_s i_{sq}$$

$$V_{sq} = R_s i_{sq} + (\omega + \omega_{sl}) L_s i_{sd}$$

$$\omega_{sl} = \frac{R_r}{L_r}\frac{i_{sq}}{i_{sd}}$$

$$\frac{B_v \omega}{P_p} + B_c + W + \rho T_{rated} = \frac{3}{2} P_p \frac{L_m^2}{L_r} i_{sd} i_{sq}$$

$$V_{sd}^2 + V_{sq}^2 \leq V_{max}^2$$

$$i_{sd}^2 + i_{sq}^2 \leq I_{max}^2$$

$$i_{sd} \leq I_{d,max}$$

where
$V_{sd}$ is a stator d-axis voltage for the induction motor,
$V_{sq}$ is a stator q-axis voltage for the induction motor,
$i_{sd}$ is a stator d-axis current for the induction motor,
$i_{sq}$ is a stator q-axis current for the induction motor,
$V_{max}$ is a voltage limit for the induction motor,
$I_{max}$ is a current limit for the induction motor,
$R_s$ is a stator resistance of the induction motor,
$R_r$ is a rotor resistance of the induction motor,
$L_s$ is a stator inductance of the induction motor,
$L_r$ is a rotor inductance of the induction motor,
$L_m$ is a mutual inductance of the induction motor,
σ is a leakage factor of the induction motor,
$B_v$ is the viscous friction coefficient,
$B_c$ is the Coulomb friction,
W is the load, wherein the load is one of a constant load on the motion system or a maximum load on the motion system,
$\rho T_{rated}$ is a percentage of a rated torque of the induction motor,
$P_p$ is a number of pole pairs of the induction motor, and
$\omega_{sl}$ is a slip frequency of the induction motor.

10. A method for determining a speed operation range for a controlled mechanical system controlled by a motion controller, comprising:
receiving, by a system comprising at least one processor, a Coulomb friction, a viscous friction coefficient, and a load of the controlled mechanical system;
generating, based on the Coulomb friction, the viscous friction coefficient, and the load, a steady state torque model that defines values of steady state torque for the controlled mechanical system as a function of a speed of the controlled mechanical system;
executing, by the system, an optimization routine on the steady state torque model and mapping data that maps a range of torque values corresponding to d-axis current values and q-axis current values of the controlled mechanical system;
determining, by the system based on a result of the executing, a maximum speed value for operation of the controlled mechanical system that produces stator currents and voltages that are equal to or less than respective current and voltage limits of a motor that drives the controlled mechanical system; and
regulating, by the system based on the maximum speed value, at least one of a q-axis current reference signal or a d-axis current reference signal generated by the motion controller to maintain a speed of the controlled mechanical system at or below the maximum speed value.

11. The method of claim 10, wherein the determining comprises determining, as the maximum speed value, a first maximum speed value for operation of the controlled mechanical system in a constant torque region, and
the method further comprises:
determining, by the system based on execution of another optimization routine on the steady state torque model and other mapping data that maps a range of d-axis current values corresponding to q-axis current values for the controlled mechanical system, a second maximum speed value for operation of the controlled mechanical system in a constant power region that produces stator currents and voltages that are equal to or less than the respective current and voltage limits of the controlled mechanical system.

12. The method of claim 10, wherein the determining comprises determining, as the maximum speed value, a maximum speed for operation in a constant torque region that yields a steady state torque corresponding to d-axis and q-axis currents that correspond to a maximum torque per ampere (MTPA) curve for the controlled mechanical system and that do not exceed the current and voltage limits.

13. The method of claim 12, wherein the motor is a permanent magnet synchronous motor (PMSM), and the determining comprises setting the maximum speed value for operation in the constant torque region equal to a value of a motor speed ω that solves min(–ω)

subject to $$V_{sd} = R_s i_{sd} - \omega L_{sq} i_{sq}$$

$$V_{sq} = R_s i_{sq} + \omega(L_{sd} i_{sd} + \lambda_m)$$

$$i_{sd} = f_{sd,mtpa}\left(\frac{B_v \omega}{P_p} + B_c + W + \rho T_{rated}\right)$$

-continued $$i_{sq} = f_{sq,mtpa}\left(\frac{B_v\omega}{P_p} + B_c + W + \rho T_{rated}\right)$$

$$V_{sd}^2 + V_{sq}^2 \le V_{max}^2$$

$$i_{sd}^2 + i_{sq}^2 \le I_{max}^2$$

where $V_{sd}$ is a stator d-axis voltage for the PMSM,
$V_{sq}$ is a stator q-axis voltage for the PMSM,
$i_{sd}$ is a stator d-axis current for the PMSM,
$i_{sq}$ is a stator q-axis current for the PMSM,
$V_{max}$ is a voltage limit for the PMSM,
$I_{max}$ is a current limit for the PMSM,
$R_s$ is a stator resistance of the PMSM,
$L_{sq}$ is a stator q-axis inductance of the PMSM,
$L_{sd}$ is a stator d-axis inductance of the PMSM,
$\lambda_m$ is a rotor flux of the PMSM,
$B_v$ is the viscous friction coefficient,
$B_c$ is the Coulomb friction,
W is the load, wherein the load is one of a constant load on the motion system or a maximum load on the motion system,
$\rho T_{rated}$ is a percentage of a rated torque of the PMSM,
$P_p$ is a number of pole pairs of the PMSM,
$f_{sd,mtpa}(T)$ is a function that defines, as a first portion of the mapping data, values of the stator d-axis current on the MTPA curve corresponding to respective values of torque T, and
$f_{sq,mtpa}(T)$ is a function that outputs a defines, as a second portion of the mapping data, values of the stator q-axis current on the MTPA curve corresponding to respective values of the torque T.

14. The method of claim 11, wherein the determining the second maximum speed values comprises determining, as the second maximum speed value, a maximum speed that does not cause the motor to exceed the current and voltage limits and that yields a d-axis current that is greater than or equal to a maximum torque per flux (MTPF) curve of the controlled mechanical system.

15. The method of claim 14, wherein the motor is a permanent magnet synchronous motor (PMSM), and the determining the second maximum speed value comprises setting the second maximum speed value for operation in the constant power region equal to a value of a motor speed ω that solves $$\min(-\omega)$$

subject to $$V_{sd} = R_s i_{sd} - \omega L_{sq} i_{sq}$$

$$V_{sq} = R_s i_{sq} + \omega(L_{sd} i_{sd} + \lambda_m)$$

$$\frac{B_v\omega}{P_p} + B_c + W + \rho T_{rated} = 1.5 P_p(\lambda_m + (L_{sd} - L_{sq})i_{sd})i_{sq}$$

$$f_{sd,mtpf}(i_{sq}) - i_{sd} \le 0$$

$$i_{sd} \le 0$$

$$V_{sd}^2 + V_{sq}^2 \le V_{max}^2$$

$$i_{sd}^2 + i_{sq}^2 \le I_{max}^2$$

where $V_{sd}$ is a stator d-axis voltage for the PMSM,
$V_{sq}$ is a stator q-axis voltage for the PMSM,
$i_{sd}$ is a stator d-axis current for the PMSM,
$i_{sq}$ is a stator q-axis current for the PMSM,
$V_{max}$ is a voltage limit for the PMSM,
$I_{max}$ is a current limit for the PMSM,
$R_s$ is a stator resistance of the PMSM,
$L_{sq}$ is a stator q-axis inductance of the PMSM,
$L_{sd}$ is a stator d-axis inductance of the PMSM,
$\lambda_m$ is a rotor flux of the PMSM,
$B_v$ is the viscous friction coefficient,
$B_c$ is the Coulomb friction,
W is the load, wherein the load is one of a constant load on the motion system or a maximum load on the motion system,
$\rho T_{rated}$ is a percentage of a rated torque of the PMSM,
$P_p$ is a number of pole pairs of the PMSM, and
$f_{sd,mtpf}(i_{sq})$ is a function that outputs a defines, as the other mapping data, values of the stator d-axis current on the MTPF curve corresponding to values of the stator q-axis current $i_{sq}$.

16. The method of claim 12, wherein the motor is an induction motor, and the determining the one or more maximum speed values comprises setting the first maximum speed value for operation in the constant torque region equal to a value of a motor speed ω that solves $$\min(-\omega)$$

subject to $$V_{sd} = R_s i_{sd} - (\omega + \omega_{sl})\sigma L_s i_{sq}$$

$$V_{sq} = R_s i_{sq} + (\omega + \omega_{sl})L_s i_{sd}$$

$$\omega_{sl} = \frac{R_r}{L_r}$$

$$i_{sd} = i_{sq}$$

$$\frac{B_v\omega}{P_p} + B_c + W + \rho T_{rated} = \frac{3}{2}P_p\frac{L_m^2}{L_r}i_{sd}i_{sq}$$

$$V_{sd}^2 + V_{sq}^2 \le V_{max}^2$$

$$i_{sd}^2 + i_{sq}^2 \le I_{max}^2$$

$$i_{sd} \le I_{d,max}$$

where $V_{sd}$ is a stator d-axis voltage for the induction motor,
$V_{sq}$ is a stator q-axis voltage for the induction motor,
$i_{sd}$ is a stator d-axis current for the induction motor,
$i_{sq}$ is a stator q-axis current for the induction motor,
$V_{max}$ is a voltage limit for the induction motor,
$I_{max}$ is a current limit for the induction motor,
$R_s$ is a stator resistance of the induction motor,
$R_r$ is a rotor resistance of the induction motor,
$L_s$ is a stator inductance of the induction motor,
$L_r$ is a rotor inductance of the induction motor,
$L_m$ is a mutual inductance of the induction motor,
σ is a leakage factor of the induction motor,
$B_v$ is the viscous friction coefficient,
$B_c$ is the Coulomb friction,
W is the load, wherein the load is one of a constant load on the motion system or a maximum load on the motion system,
$\rho T_{rated}$ is a percentage of a rated torque of the induction motor,
$P_p$ is a number of pole pairs of the induction motor, and
$\omega_{sl}$ is a slip frequency of the induction motor.

17. The method of claim 14, wherein the motor is an induction motor, and the determining the second maximum speed values comprises setting the second maximum speed value for operation in the constant power region equal to a value of a motor speed ω that solves $$\min(-\omega)$$

subject to $$V_{sd} = R_s i_{sd} - (\omega + \omega_{sl})\sigma L_s i_{sq}$$

$$V_{sq} = R_s i_{sq} + (\omega + \omega_{sl})L_s i_{sd}$$

$$\omega_{sl} = \frac{R_r}{L_r} \frac{i_{sq}}{i_{sd}}$$

$$\frac{B_v \omega}{P_p} + B_c + W + \rho T_{rated} = \frac{3}{2} P_p \frac{L_m^2}{L_r} i_{sd} i_{sq}$$

$$V_{sd}^2 + V_{sq}^2 \leq V_{max}^2$$

$$i_{sd}^2 + i_{sq}^2 \leq I_{max}^2$$

$$i_{sd} \leq I_{d,max}$$

where
$V_{sd}$ is a stator d-axis voltage for the induction motor,
$V_{sq}$ is a stator q-axis voltage for the induction motor,
$i_{sd}$ is a stator d-axis current for the induction motor,
$i_{sq}$ is a stator q-axis current for the induction motor,
$V_{max}$ is a voltage limit for the induction motor,
$I_{max}$ is a current limit for the induction motor,
$R_s$ is a stator resistance of the induction motor,
$R_r$ is a rotor resistance of the induction motor,
$L_s$ is a stator inductance of the induction motor,
$L_r$ is a rotor inductance of the induction motor,
$L_m$ is a mutual inductance of the induction motor,
σ is a leakage factor of the induction motor,
$B_v$ is the viscous friction coefficient,
$B_c$ is the Coulomb friction,
W is the load, wherein the load is one of a constant load on the motion system or a maximum load on the motion system,
$\rho T_{rated}$ is a percentage of a rated torque of the induction motor,
$P_p$ is a number of pole pairs of the induction motor, and
$\omega_{sl}$ is a slip frequency of the induction motor.

18. A non-transitory computer-readable medium having stored thereon computer-executable instructions that, in response to execution, cause a computer system to perform operations, comprising:

generating a steady state torque model based on a Coulomb friction, a viscous friction coefficient, and a load of a motion system, wherein the steady state torque model defines values of steady state torque for the motion system as a function of a speed of the motion system;

determining a maximum speed value for operation of the motion system based on application of an optimization routine to the steady state torque model and mapping data that maps a range of torque values corresponding to d-axis current values and q-axis current values of the motion system, wherein the determining comprises determining, as the maximum speed value, a maximum speed that causes a motor that drives the motion system to produces stator currents and voltages that are equal to or less than respective current and voltage limits of the motor; and controlling, based on the maximum speed value, at least one of a q-axis current reference signal or a d-axis current reference signal generated by a motion controller that facilitates control of the motion system, wherein the controlling comprises controlling the at least one of a q-axis current reference signal or a d-axis current reference signal to maintain a speed of the motion system at or below the maximum speed value.

19. The non-transitory computer-readable medium of claim 18, wherein the determining the maximum speed values comprises determining a first maximum speed value for operation of the motion system in a normal speed region, and the operations further comprise determining a second maximum speed value for operation of the motion system in a field weakening region based on application of another optimization routine on the steady state torque model and other mapping data that maps a range of d-axis current values corresponding to q-axis current values for the motion system.

20. The system of claim 1, wherein the maximum speed determination component is further configured to generate a motor model based on characteristics of a motor used to drive the motion system, the characteristics comprising at least stator resistance, stator inductances, rotor flux, and a number of pole pairs, and determine the maximum speed value based on application of the optimization routine to the mapping data, the steady state torque model, and the motor model.

* * * * *